US012574777B2

(12) United States Patent
Zorgui et al.

(10) Patent No.: US 12,574,777 B2
(45) Date of Patent: Mar. 10, 2026

(54) HETEROGENEOUS POINT CLOUD REPORTING IN CELLULAR SYSTEMS

(71) Applicant: QUALCOMM Incorporated, San Diego, CA (US)

(72) Inventors: Marwen Zorgui, San Diego, CA (US); Mahmoud Ashour, San Diego, CA (US); Ahmed Attia Abotabl, San Diego, CA (US); Balwinderpal Sachdev, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 610 days.

(21) Appl. No.: 18/054,519

(22) Filed: Nov. 10, 2022

(65) Prior Publication Data

US 2024/0163702 A1    May 16, 2024

(51) Int. Cl.
*H04W 24/10* (2009.01)

(52) U.S. Cl.
CPC ................................... *H04W 24/10* (2013.01)

(58) Field of Classification Search
CPC ......... H04W 24/10; H04L 12/28; H04L 12/50
USPC ................................. 370/329, 401, 402, 403
See application file for complete search history.

(56) References Cited

U.S. PATENT DOCUMENTS

| 2019/0206123 A1 | 7/2019 | Zhou et al. |
| 2020/0274656 A1 | 8/2020 | Gordaychik |
| 2021/0021664 A1 | 1/2021 | Oyman |
| 2023/0400995 A1 | 12/2023 | Waghmare et al. |
| 2024/0004636 A1* | 1/2024 | Takeuchi ................ G06F 9/455 |

OTHER PUBLICATIONS

International Search Report and Written Opinion—PCT/US2023/032908—ISA/EPO—Dec. 1, 2023.

* cited by examiner

*Primary Examiner* — Dang T Ton
(74) *Attorney, Agent, or Firm* — Procopio, Cory, Hargreaves & Savitch LLP/QUALCOMM Incorporated

(57) ABSTRACT

A first network entity may transmit, for a second network entity, an indication of point cloud reporting capabilities of the first network entity. The point cloud reporting capabilities of the first network entity may include a capability associated with heterogeneous point cloud reporting. The point cloud reporting capabilities of the first network entity may correspond to one or more of at least one reportable property, a point cloud source, or a frequency of point cloud generation. The point cloud source may correspond to at least one of a cellular transceiver, an FMCW radar, a Wi-Fi transceiver, or a lidar device. The first network entity may identify a first point cloud based on non-cellular sensing. The first network entity may transmit, for the second network entity, a first indication of the first point cloud based on the point cloud reporting capabilities of the first network entity.

13 Claims, 13 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

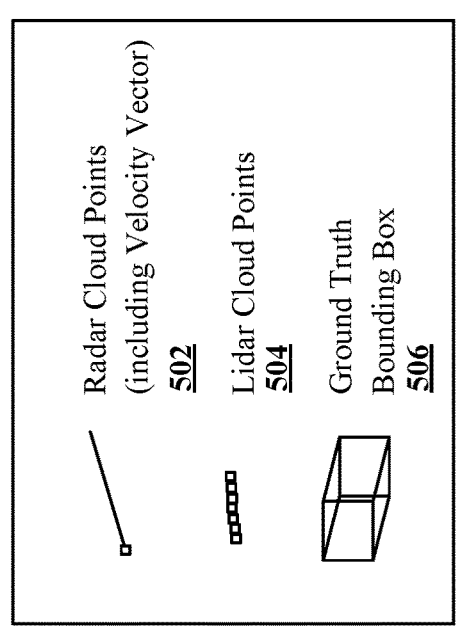
Radar Cloud Points
(including Velocity Vector)
502
Lidar Cloud Points
504
Ground Truth
Bounding Box
506
500
FIG. 5

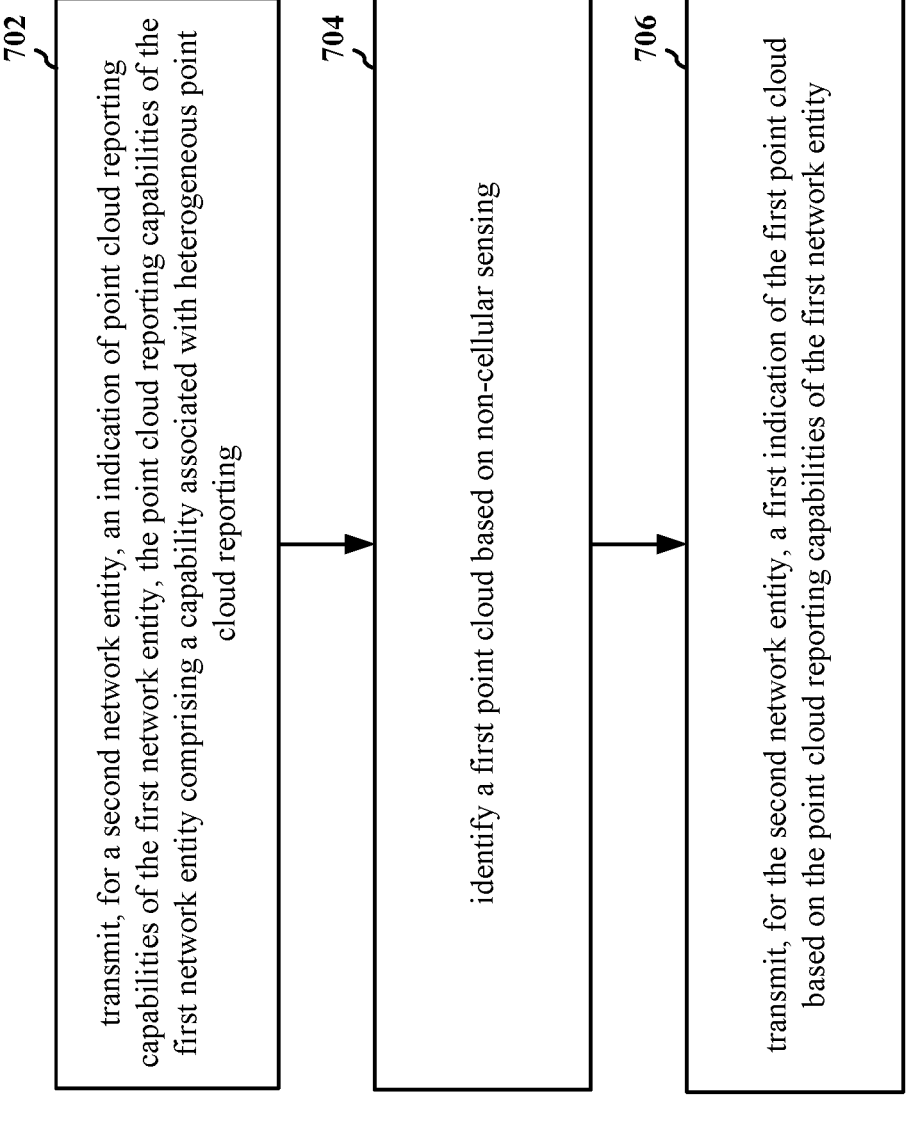

702 transmit, for a second network entity, an indication of point cloud reporting capabilities of the first network entity, the point cloud reporting capabilities of the first network entity comprising a capability associated with heterogeneous point cloud reporting 704 identify a first point cloud based on non-cellular sensing 706 transmit, for the second network entity, a first indication of the first point cloud based on the point cloud reporting capabilities of the first network entity

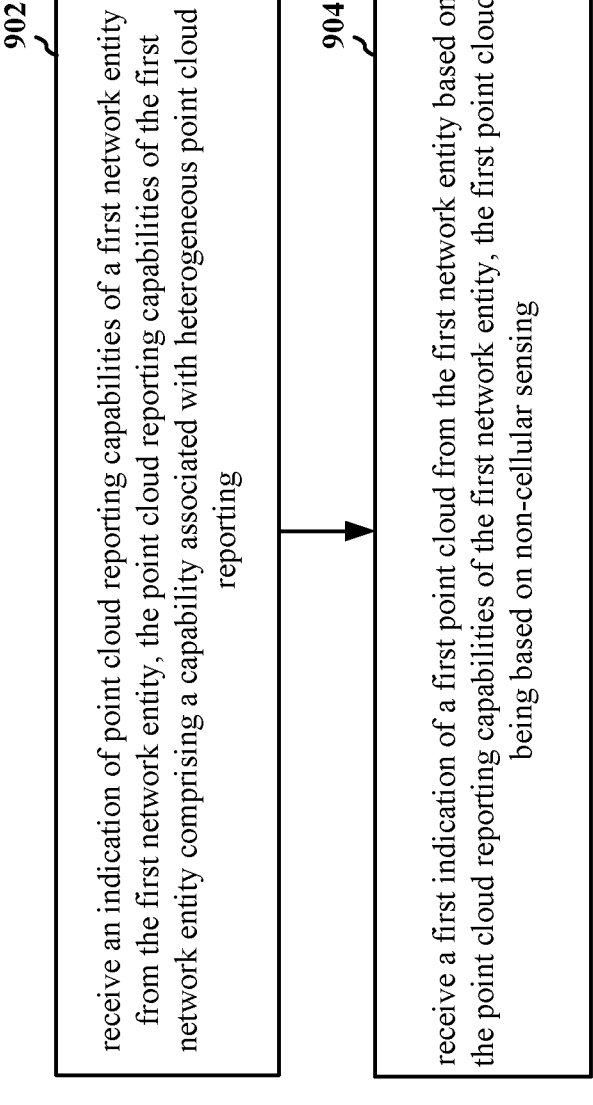

902 receive an indication of point cloud reporting capabilities of a first network entity from the first network entity, the point cloud reporting capabilities of the first network entity comprising a capability associated with heterogeneous point cloud reporting

904 receive a first indication of a first point cloud from the first network entity based on the point cloud reporting capabilities of the first network entity, the first point cloud being based on non-cellular sensing

HETEROGENEOUS POINT CLOUD REPORTING IN CELLULAR SYSTEMS

TECHNICAL FIELD

The present disclosure relates generally to communication systems, and more particularly, to point cloud reporting associated with sensing in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first network entity. The apparatus may transmit, for a second network entity, an indication of point cloud reporting capabilities of the first network entity. The point cloud reporting capabilities of the first network entity may include a capability associated with heterogeneous point cloud reporting. The apparatus may identify a first point cloud based on non-cellular sensing. The apparatus may transmit, for the second network entity, a first indication of the first point cloud based on the point cloud reporting capabilities of the first network entity.

In an aspect of the disclosure, a method, a computer-readable medium, and an apparatus are provided. The apparatus may be a second network entity. The apparatus may receive an indication of point cloud reporting capabilities of a first network entity from the first network entity. The point cloud reporting capabilities of the first network entity may include a capability associated with heterogeneous cloud reporting. The apparatus may receive a first indication of a first point cloud from the first network entity based on the point cloud reporting capabilities of the first network entity. The first point cloud may be based on non-cellular sensing.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating example radar points and lidar points associated with sensing of a vehicle.

FIG. 7 is a flowchart of a method of wireless communication.

FIG. 9 is a flowchart of a method of wireless communication.

DETAILED DESCRIPTION

Figure 1:
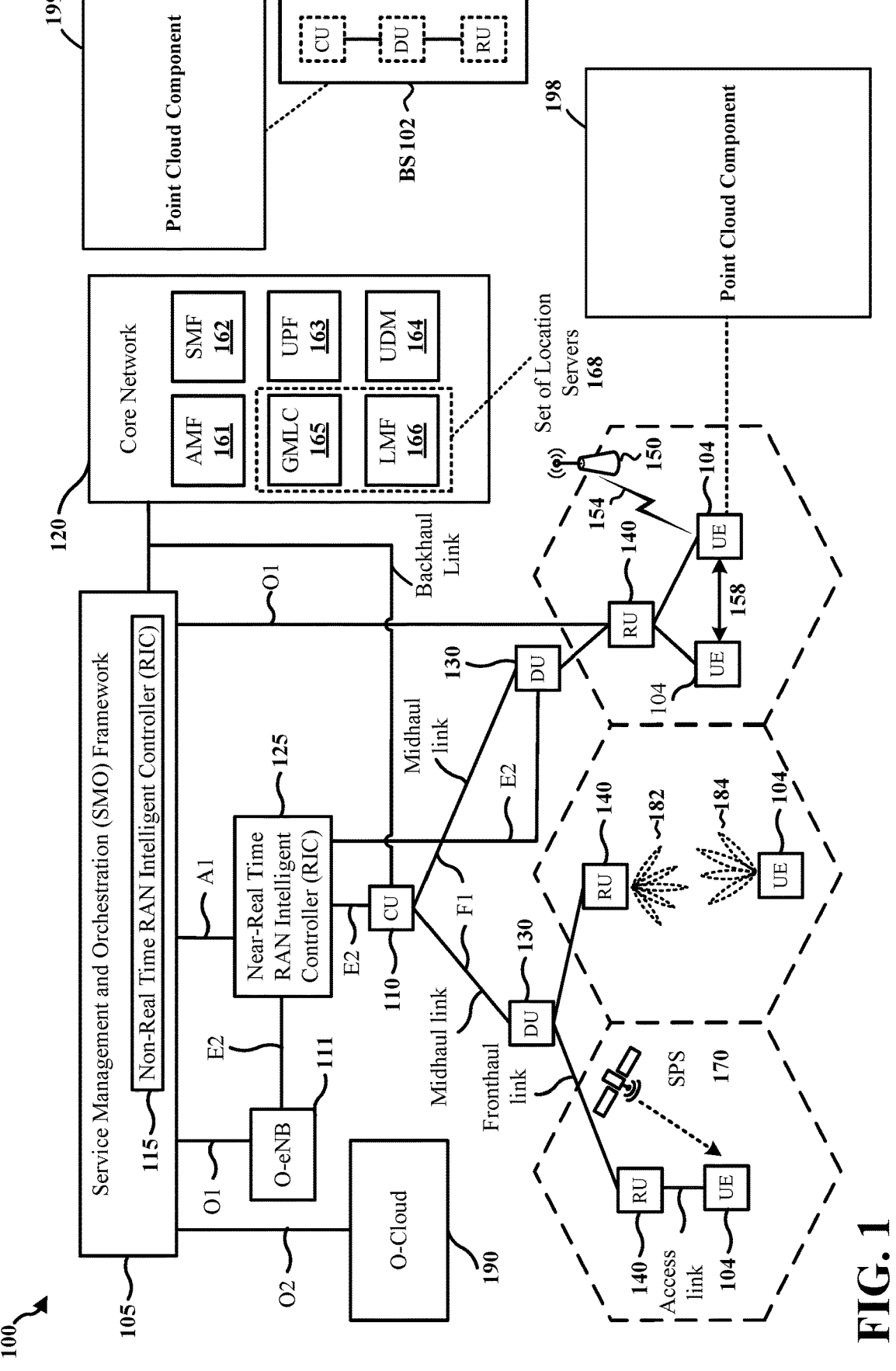
FIG. 1 is a diagram illustrating an example of a wireless communications system and an access network.

A UE (or a base station, a transmit receive point (TRP), etc.) with access to or equipped with suitable sensors may generate a point cloud that may represent the perception of the UE (or the base station, the TRP, etc.) of its surrounding environment. For example, a vehicle UE (e.g., a connected car) equipped with frequency-modulated continuous wave (FMCW) transceivers may be able to generate point clouds representing the vehicle UE's perception of the surrounding environment. Hereinafter point clouds generated based on non-cellular waveforms (i.e., waveforms not associated with a cellular wireless communication system) may be referred to as non-cellular point clouds. Accordingly, a UE (or a base station, a TRP, etc.) may generate cellular point clouds (i.e., point clouds generated using capabilities of a cellular wireless communication system including cellular radio frequency (RF) waveforms) as well as non-cellular point clouds. The result may be a set of heterogeneous point clouds generated by the UE (or the base station, the TRP, etc.).

According to one or more aspects, a first network entity may transmit, for a second network entity, an indication of point cloud reporting capabilities of the first network entity. The point cloud reporting capabilities of the first network entity may include a capability associated with heterogeneous point cloud reporting. The first network entity may identify a first point cloud based on non-cellular sensing. The first network entity may transmit, for the second network entity, a first indication of the first point cloud based on the point cloud reporting capabilities of the first network entity. Accordingly, non-cellular point clouds may be reported by the entity that performs sensing/reporting to the sensing entity, alone or together with cellular point clouds.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units.

Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., when operating as the first network entity) may include a point cloud component 198 that may be configured to transmit, for a second network entity, an indication of point cloud reporting capabilities of the first network entity. The point cloud reporting capabilities of the first network entity may include a capability associated with heterogeneous point cloud reporting. The point cloud component 198 may be configured to identify a first point cloud based on non-cellular sensing. The point cloud component 198 may be configured to transmit, for the second network entity, a first indication of the first point cloud based on the point cloud reporting capabilities of the first network entity. In certain aspects, the base station 102 (e.g., when operating as the first network entity) may include a point cloud component 199 that may be configured to transmit, for a second network entity, an indication of point cloud reporting capabilities of the first network entity. The point cloud reporting capabilities of the first network entity may include a capability associated with heterogeneous point cloud reporting. The point cloud component 199 may be configured to identify a first point cloud based on non-cellular sensing. The point cloud component 199 may be configured to transmit, for the second network entity, a first indication of the first point cloud based on the point cloud reporting capabilities of the first network entity. Although the following description may be focused on 5G NR, the concepts described herein may be applicable to other similar areas, such as LTE, LTE-A, CDMA, GSM, and other wireless technologies.

Figures 2A, 2B, 2C, 2D:
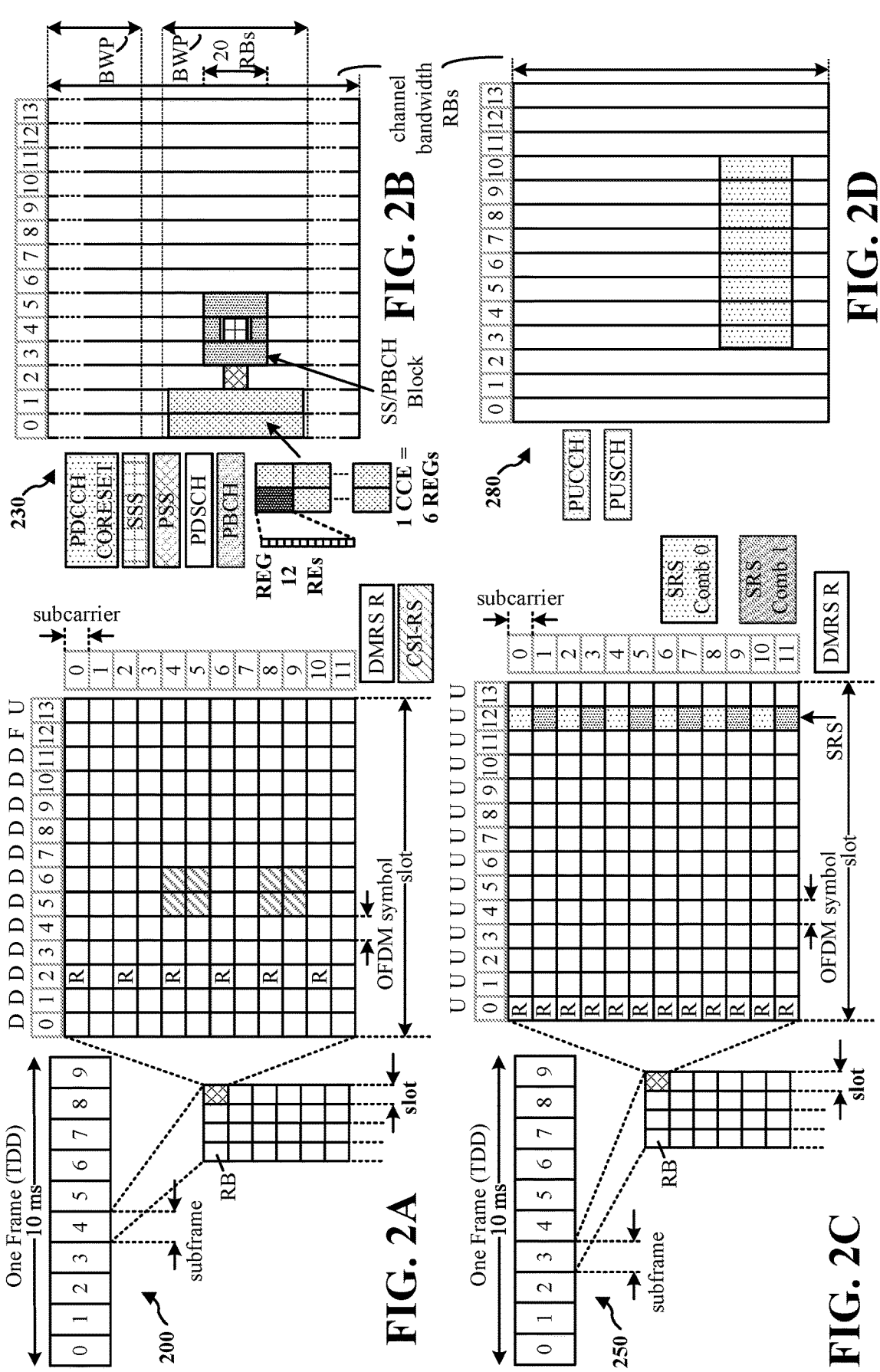
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
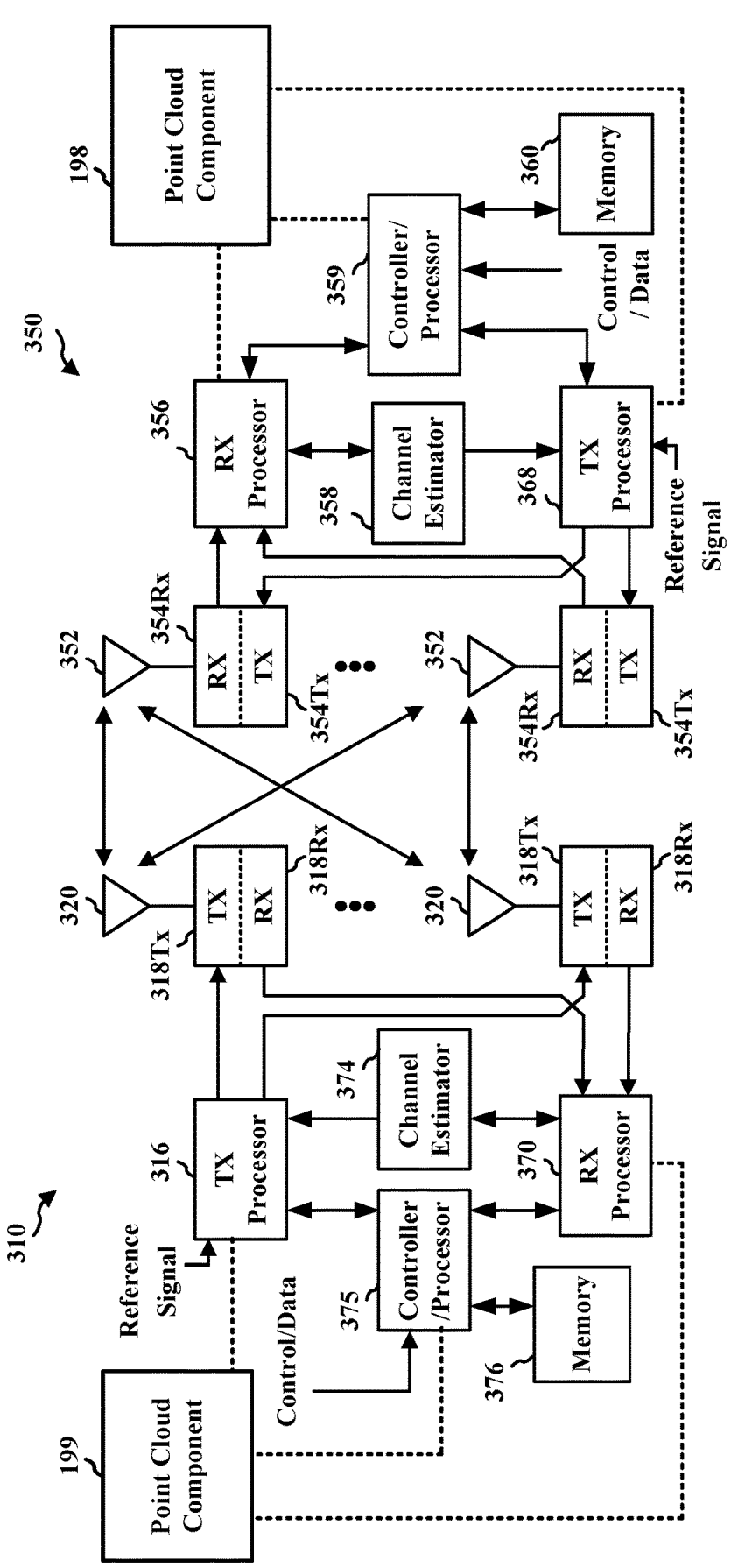
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/ processor 375 is also responsible for error detection using an ACK and/or NACK protocol to support HARQ operations.

At least one of the TX processor 368, the RX processor 356, and the controller/processor 359 may be configured to perform aspects in connection with the point cloud component 198 of FIG. 1.

At least one of the TX processor 316, the RX processor 370, and the controller/processor 375 may be configured to perform aspects in connection with the point cloud component 199 of FIG. 1.

Figure 4:
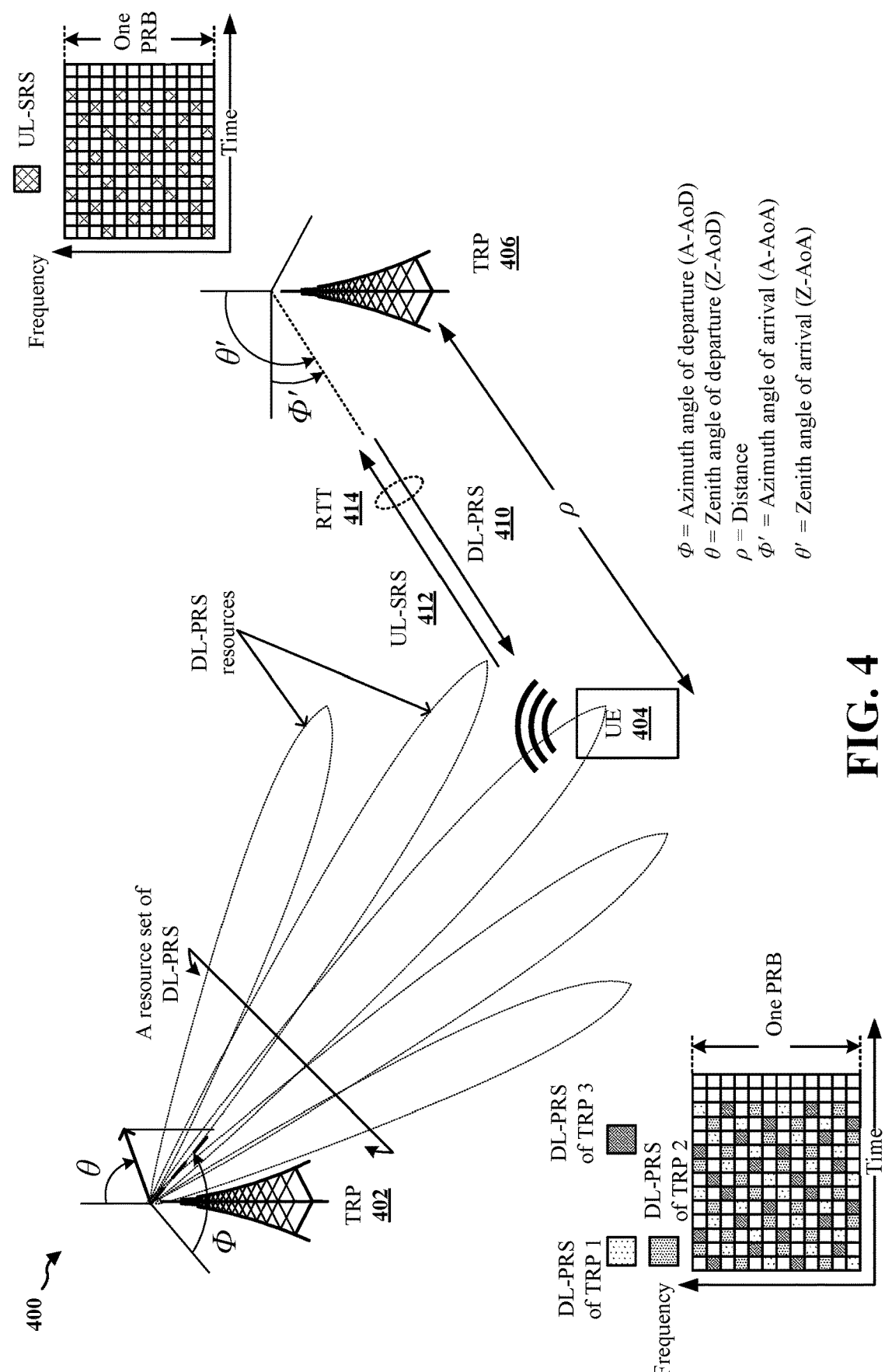
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-\|T_{SRS\_TX}-T_{PRS\_RX}\|$. Accordingly, multi-RTT positioning may make use of the UE Rx-Tx time difference measurements (i.e., $\|T_{SRS\_TX}-T_{PRS\_RX}\|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $\|T_{SRS\_RX}-T_{PRS\_TX}\|$) and UL-SRS-RSRP at multiple TRPs 402, 406 of uplink signals transmitted from UE 404. The UE 404 measures the UE Rx-Tx time difference measurements (and DL-PRS-RSRP of the received signals) using assistance data received from the positioning server, and the TRPs 402, 406 measure the gNB Rx-Tx time difference measurements (and UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and DL-PRS-RSRP) of downlink signals received from multiple TRPs 402, 406 at the UE 404. The UE 404 measures the DL RSTD (and DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and UL-SRS-RSRP) at multiple TRPs 402, 406 of uplink signals transmitted from UE 404. The TRPs 402, 406 measure the UL-RTOA (and UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Cellular RF sensing may become a major use case in future cellular networks. Dedicated frequency and time domain resources may be made available for sensing operations. Further, a core network entity may be dedicated to the sensing operations. The use cases for RF sensing may include, for example, joint communication and sensing, environment scanning, object detection, or weather monitoring.

In some configurations, a cellular wireless communication system (e.g., a 5G system) may support cellular-based sensing (e.g., 5G NR-based sensing) and collection of the sensing measurement data. The cellular wireless communication system may support the reporting of the cellular-based sensing measurement data for processing. Further, the cellular wireless communication system may support the processing of the sensing measurement data and association of the sensing measurement data with other assistance information (e.g., location information). Moreover, the cellular wireless communication system may support a mechanism to expose the sensing measurement data or sensing results to an authorized third-party application via the core network.

In some configurations, an entity that performs sensing (e.g., a UE, a base station, a TRP, etc.) may report point clouds to a sensing entity (e.g., a core network entity). To facilitate point cloud reporting, an information element (IE) for a point cloud and associated configurations may be provided or defined. In particular, a point cloud may refer to a set of n-dimensional points where the dimensions may each correspond to a parameter (property) such as the range, the Doppler, the azimuth angle, or the elevation angle, etc.

In some configurations, the point cloud may be a product of a cellular system. For example, an entity that performs sensing (e.g., a UE, a base station, a TRP, etc.) may transmit sensing RSs and/or receive signals corresponding to the sensing RSs, and may generate a point cloud based on the received signals at the receiving node (the receiving node may or may not be the same node as the transmitting node). To enable the cellular RF sensing, the network may allocate resources for the sensing RSs. Hereinafter a point cloud generated based on the cellular RF sensing may be referred to as a cellular point cloud. In the context of the radio detection and ranging (radar) technology and more generally in the context of perception, a point cloud may also be generated based on non-cellular waveforms, through such (onboard) sensors as cameras, light detection and ranging (lidar) devices, Wi-Fi signal transceivers, sound navigation and ranging (sonar) devices, or FMCW transceivers, etc.

A UE (or a base station, a TRP, etc.) with access to or equipped with suitable sensors may generate a point cloud that may represent the perception of the UE (or the base station, the TRP, etc.) of its surrounding environment. The UE (or the base station, the TRP, etc.) may be referred to hereinafter as the entity that performs sensing. For example, a vehicle UE (e.g., a connected car) equipped with FMCW transceivers may be able to generate point clouds representing the vehicle UE's perception of the surrounding environment. Hereinafter point clouds generated based on non-cellular waveforms (i.e., waveforms not associated with a cellular wireless communication system) may be referred to as non-cellular point clouds. Accordingly, a UE (or a base station, a TRP, etc.) may generate cellular point clouds as well as non-cellular point clouds. The result may be a set of heterogeneous point clouds generated by the UE (or the base station, the TRP, etc.).

Aspects of the disclosure may relate to the configuration associated with and the reporting of heterogeneous point clouds. In particular, an entity that performs sensing (e.g., a UE, a base station, a TRP, etc.) may provide an indication of the capability of the entity to generate and/or report non-cellular point clouds. In some configurations, the entity that performs sensing may receive configurations associated with cellular point clouds and/or non-cellular point clouds from the network (in a particular example, the sensing entity). In some configurations, the entity that performs sensing may execute point cloud generation and/or reporting based on energy operations at the entity.

In some configurations, an entity that performs sensing (e.g., a UE, a base station, a TRP, etc.) may exchange information about non-cellular point cloud-related capabilities with the network. In one configuration, the entity that performs sensing may indicate a point cloud reporting capability (e.g., whether the entity that performs sensing supports reporting a point cloud) to the sensing entity. For example, the entity that performs sensing may provide the capability indication as part of providing indications of sensing-related capabilities to the sensing entity. The capability indication may be provided at different granularity levels. In one configuration, the indication of the point cloud reporting capability may include an indication of one or more properties (e.g., the range, the velocity, the azimuth angle, the elevation angle, etc.) that may be reported by the entity that performs sensing. In one configuration, the indication of the point cloud reporting capability may include an indication of one or more sources of the point clouds that may be reported. For example, the sources may include one or more of a lidar device, a FMCW transceiver, a Wi-Fi signal transceiver, and so on. In some configurations, the operating parameters related to the point cloud sources, such as the frequency of operation, the bandwidth, etc., may also be included in the indication of the point cloud reporting capability. In one configuration, the indication of the point cloud reporting capability may include an indication of a frequency of point cloud generation.

FIG. 5 is a diagram 500 illustrating example radar points and lidar points associated with sensing of a vehicle. FIG. 5 shows radar cloud points 502 and lidar cloud points 504 with respect to a ground truth bounding box 506 corresponding to the example vehicle. The density of points may be different between cellular point clouds and non-cellular point clouds, and may be different between non-cellular point clouds from different sources. For example, as shown in FIG. 5, lidar point clouds may include denser points than FMCW point clouds (e.g., radar point clouds).

In one configuration, the sensing entity may choose to rely uniquely on either non-cellular point clouds or cellular point clouds. For example, the sensing entity may provide an indication to the entity that performs sensing such that just non-cellular point clouds are reported and cellular point clouds are not generated and reported. In another example, the sensing entity may provide an indication to the entity that performs sensing such that just cellular point clouds are reported and non-cellular point clouds are not generated and reported. On the other hand, fusing cellular point clouds and non-cellular point clouds may bring more flexibility and higher expected performance gains for the sensing operation.

In some configurations, the entity that performs sensing may generate and report a non-cellular point cloud from single source. In some other configurations, the entity that performs sensing may generate and report non-cellular point clouds from multiple sources.

In some configuration, the sensing entity may configure the entity that performs sensing, such that the entity that performs sensing may report the cellular point cloud and the non-cellular point cloud separately (independently). In one configuration, based on the configuration provided by the sensing entity, the entity that perform sensing may report both the cellular point cloud and the non-cellular point cloud in a same reporting occasion. The point cloud reporting may accommodate the difference in the frequencies at which the cellular point cloud and the non-cellular point cloud are generated. In one configuration, the sensing entity may specify, in the configuration provided to the entity that performs sensing, the reporting of a subset (or a function) of all non-cellular point clouds generated between two reporting occasions. For example, based on the configuration provided by the sensing entity, the entity that perform sensing may report just the points that appear in all non-cellular point clouds generated between two reporting occasions (and may exclude other points from the report). On the other hand, the entity that perform sensing may report cellular point clouds as normal (i.e., all points in the cellular point clouds may be reported).

In some configuration, the sensing entity may configure the entity that performs sensing, such that the entity that performs sensing may report each point cloud separately. Accordingly, for example, the network may configure a first set of resources for the reporting of the cellular point clouds, and may configure a second set of resources for the reporting of the non-cellular point clouds.

In some configurations, the entity that performs sensing may report both the non-cellular point cloud and the cellular point cloud to the sensing entity, and the sensing entity may perform further processing of both the non-cellular point cloud and the cellular point cloud. In some configurations, to reduce the reporting load, based on the configuration provided by the sensing entity, the entity that performs sensing may modify (filter) a point cloud of a first type (e.g., a non-cellular point cloud or a cellular point cloud) based on a point cloud of a second type, and may report just the modified point cloud of the first type. Further, the entity that performs sensing may not directly report the point cloud of the second type. In other words, the reported points may be a function of both the point cloud of the first type and the point cloud of the second type.

In one configuration, the entity that performs sensing may modify a cellular point cloud based on a non-cellular point cloud, and may report just the modified cellular point cloud. In one example, to modify the cellular point cloud, the entity that performs sensing may keep points in the cellular point cloud that have corresponding points in the non-cellular point cloud, and may exclude (delete) points in the cellular point cloud that do not have corresponding points in the non-cellular point cloud. For example, a point in the cellular point cloud may be considered to have a corresponding point in the non-cellular point cloud if there exists a point in the non-cellular point cloud whose value (e.g., a range value, a velocity value, an angle value, etc.) differs from that of the point in the cellular point cloud by less than a threshold. After excluding points in the cellular point cloud that do not have corresponding points in the non-cellular point cloud, the entity that performs sensing may report just the modified cellular point cloud.

For example, a cellular point cloud A may include a first point A1 with a range value of 5 m and a second point A2 with a range value of 10 m. Further, in the same example, a non-cellular point cloud B may include a first point B1 with a range value of 5.2 m and a second point B2 with a range value of 6 m. If the threshold is 0.5 m, when modifying (filtering) the cellular point cloud A, the entity that performs sensing may keep the point A1 (because the point B1 is a corresponding point in the non-cellular point cloud B as the values of A1 and B1 differ by 0.2 m, which is less than the threshold of 0.5 m) and may exclude (delete) the point A2 (because there is no corresponding point for A2 in the non-cellular point cloud B). Thereafter, the entity that performs sensing may report just the modified cellular point cloud A' that includes just the point A1. The entity that performs sensing may not directly report the non-cellular point cloud B.

In some examples, a time difference threshold may be provided for the modifying (filtering) of a first point cloud based on a second point cloud. Because each point cloud may be generated independently at a different time (e.g., associated with a timestamp), two point clouds generated far apart in time may not be meaningfully compared against each other. Accordingly, in some configurations, to filter a first point cloud based on second point cloud, it may be specified the timestamps associated with the first point cloud and the second point cloud may differ by less than the time difference threshold (e.g., a time window). For example, the time difference threshold may be 0.5 ms (or any other suitable threshold). Accordingly, in the above example, the entity that performs sensing may filter the cellular point cloud A based on the non-cellular point cloud B if the cellular point cloud A and the non-cellular point cloud B are generated within a time window of 0.5 ms. If the timestamps for the cellular point cloud A and the non-cellular point cloud B differ by more than 0.5 ms, the entity that performs sensing may not filter the cellular point cloud A based on the non-cellular point cloud B.

When a point cloud of a first type is modified (filtered) based on a point cloud of a second type and then reported, the point cloud of the first type may be referred to as a reference point cloud. The point cloud of the second type, which is used for the comparison and filtering but is not directly reported, may be referred to as the non-reference point cloud. In some configurations, the reference point cloud may be a cellular point cloud and the non-reference point cloud may be a non-cellular point cloud. In some other configurations, the reference point cloud may be a non-cellular point cloud and the non-reference point cloud may be a cellular point cloud. In some configurations, the sensing entity may select the reference point cloud, and may indicate the selected reference point cloud in the configuration provided to the entity that performs sensing.

In some configurations, an entity that performs sensing may select the type(s) of the point clouds (e.g., cellular point clouds and/or non-cellular point clouds) that may be generated and reported based on an energy saving mode in which the entity that performs sensing may operate. For example, if the entity that performs sensing is a UE, the UE may report point clouds of a single type or point clouds of both types based on the energy saving operations at the UE. In particular, the UE may be configured by the network with resources for reporting point clouds of both types. Then, the UE may have the flexibility (e.g., based on a configuration from the network/sensing entity) to select a reporting mode to use (e.g., based on an energy saving operation/state at the UE). The selected reporting mode may be one of a full reporting mode (e.g., direct reporting of point clouds of both types), a comparative reporting mode (e.g., direct reporting of point clouds of just a single type after modifying/filtering, as described above), or a single type reporting mode (e.g., direct reporting of unmodified point clouds of just a single type). For example, if the UE is in a low energy state, the UE may, based on the low energy state, choose to generate and report just the cellular point cloud, and not to generate or report point clouds of other types (e.g., non-cellular point clouds). For example, because a lidar device or system may be energy consuming, the UE may choose not to activate the lidar when the UE is in a low energy state. Accordingly, the UE may not generate or report lidar-based non-cellular point clouds. As such, the UE may generate and report to the sensing entity just the cellular point cloud.

In some configurations, the sensing entity may indicate a sensing entity-selected (favored) point cloud type in the configuration provided to the entity that performs sensing. In one configuration, if a UE chooses to refrain from generating cellular point clouds for a subsequent period of time, the UE may provide a corresponding indication to the network as part of the point cloud reporting, or in a separate (dedicated) message. The indication that the UE is to refrain from generating cellular point clouds may enable the network to save energy by not transmitting sensing RSs (if the sensing RSs are transmitted by the network). However, the network may still transmit the sensing RSs if there are additional entities that perform cellular RF sensing based on the network-provided sensing RSs in the vicinity.

As described above, an entity that performs sensing may select the type(s) of the point clouds that may be generated and reported based on an energy saving mode in which the entity that performs sensing may operate. In another example, if the entity that performs sensing is a TRP, the TRP may select a point cloud reporting mode (e.g., full reporting, comparative reporting, single type reporting, etc., as described above) based on the network energy saving mode in operation at the TRP. In some configurations, based on network energy operations, the network/TRP may adjust (e.g., dynamically) the antenna configurations at the TRP.

For example, the network/TRP may selectively switch on or off antennas or antenna panels at the TRP. In some configurations, the sensing RS processing and the generation of the cellular point cloud may be enabled at a TRP when the TRP is in some network energy saving modes, and may be disabled at the TRP when the TRP is in some other network energy saving modes. In some configurations, a TRP may provide an indication of the operation mode of the TRP to the sensing entity. Similarly, in some configurations, the generation of the non-cellular point cloud may be enabled at a TRP when the TRP is in some network energy saving modes, and may be disabled at the TRP when the TRP is in some other network energy saving modes. In some configurations, the TRP may provide an indication of the reason (e.g., an error reason message) for which point clouds are not reported (e.g., point clouds of a certain type are not reported, or point clouds are not reported at all) to the sensing entity. For example, the TRP may indicate, to the sensing entity, that point cloud reports are missing due to the network energy saving mode limitation.

Figure 6:
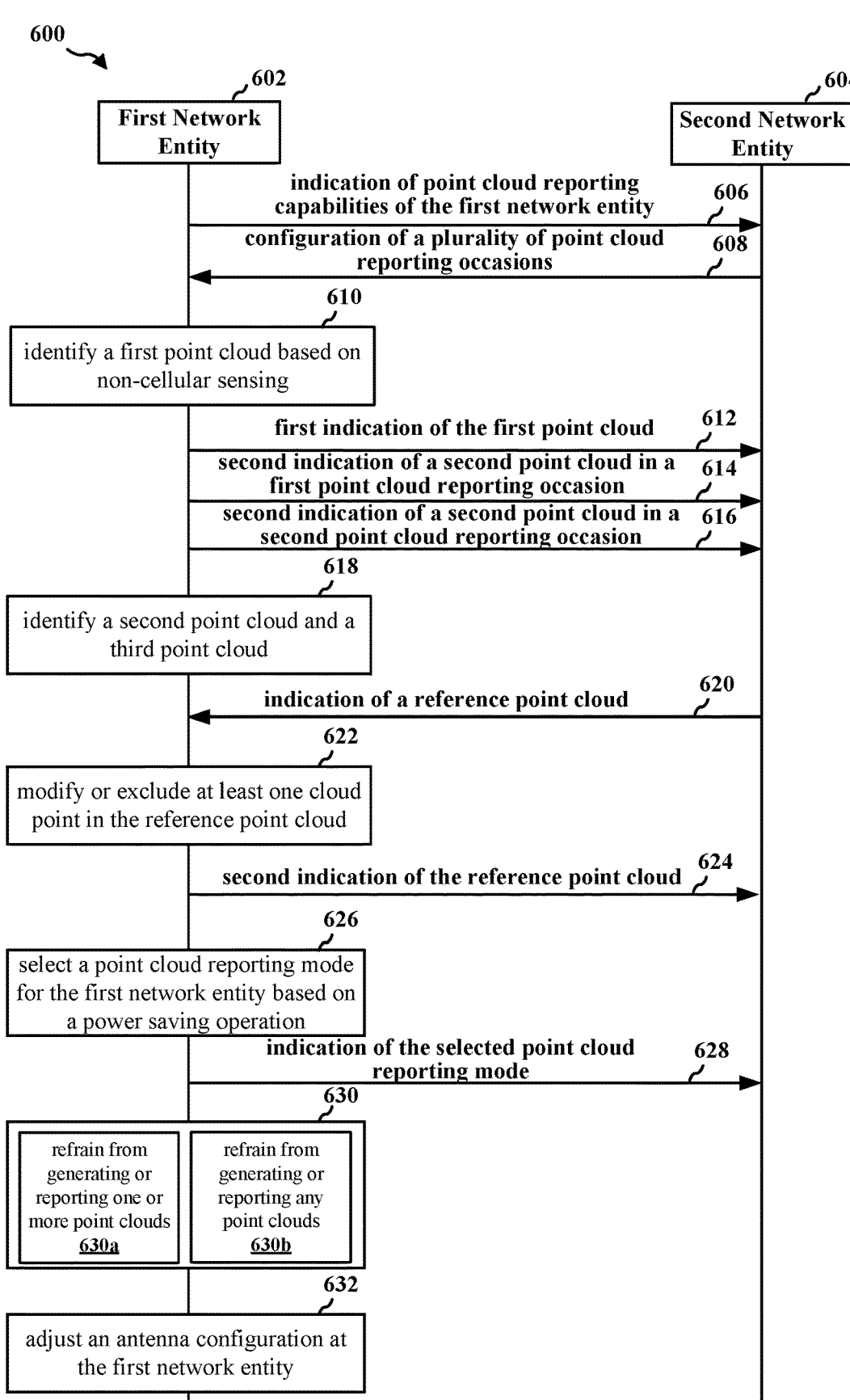
FIG. 6 is a diagram of a communication flow of a method of wireless communication.

FIG. 6 is a diagram of a communication flow 600 of a method of wireless communication. In different configurations, the first network entity 602 may be an entity that performs sensing, and may implement aspects of the UE 104/350, the base station 102/310, or a TRP. Further, the second network entity 604 may implement aspects of a sensing entity. At 606, the first network entity 602 may transmit, for a second network entity 604, an indication of point cloud reporting capabilities of the first network entity 602. The point cloud reporting capabilities of the first network entity 602 may include a capability associated with heterogeneous point cloud reporting.

In one configuration, the point cloud reporting capabilities of the first network entity 602 may correspond to one or more of at least one reportable property, a point cloud source, or a frequency of point cloud generation.

In one configuration, the point cloud source may correspond to at least one of a cellular transceiver, a radar (e.g., an FMCW radar), a Wi-Fi transceiver, or a lidar device.

In some configurations, at 608, the second network entity 604 may transmit, for the first network entity 602, a configuration of a plurality of point cloud reporting occasions.

At 610, the first network entity 602 may identify a first point cloud based on non-cellular sensing. Herein non-cellular sensing may refer to the acquisition of information about characteristics of the environment or objects within the environment (e.g., the shape, the size, the speed, the location, distances between objects, or the relative motion between objects, etc.) without using RF signals associated with the cellular network. For example, the non-cellular sensing may be based on a standalone radar using FMCW signals (e.g., one or more radars deployed in a car).

At 612, the first network entity 602 may transmit, for the second network entity 604, a first indication of the first point cloud based on the point cloud reporting capabilities of the first network entity 602.

In some configurations, the first indication of the first point cloud may be transmitted by the first network entity 602, at 612, for the second network entity 604, in a first point cloud reporting occasion in the plurality of point cloud reporting occasions. At 614, the first network entity 602 may transmit, for the second network entity 604, a second indication of a second point cloud in the first point cloud reporting occasion. The second point cloud may be based on cellular sensing. In other words, the first point cloud reporting occasion may be associated with the reporting of both cellular point clouds and non-cellular point clouds. Herein cellular sensing (or cellular RF sensing) may refer to the acquisition of information about characteristics of the environment or objects within the environment (e.g., the shape, the size, the speed, the location, distances between objects, or the relative motion between objects, etc.) using cellular RF signals.

In some configurations, the first indication of the first point cloud may be transmitted by the first network entity 602, at 612, for the second network entity 604, in a first point cloud reporting occasion in the plurality of point cloud reporting occasions. The first point cloud reporting occasion may be associated with reporting of at least one non-cellular point cloud. At 616, the first network entity 602 may transmit, for the second network entity 604, a second indication of a second point cloud in a second point cloud reporting occasion in the plurality of point cloud reporting occasions. The second point cloud may be based on cellular sensing. The second point cloud reporting occasion may be associated with reporting of at least one cellular point cloud. In other words, cellular point clouds and non-cellular point clouds may be reported separately (e.g., at different point cloud reporting occasions).

In some configurations, at 618, the first network entity 602 may identify a second point cloud and a third point cloud. The second point cloud and the third point cloud may include a reference point cloud and a non-reference point cloud.

In some configurations, the second point cloud and the third point cloud may include a cellular point cloud and a non-cellular point cloud. At 620, the first network entity 602 may receive an indication of the reference point cloud from between the second point cloud and the third point cloud (e.g., an indication of a cellular point cloud or a non-cellular point cloud) from the second network entity 604.

At 622, the first network entity 602 may modify or exclude at least one cloud point in the reference point cloud based on correlating the reference point cloud with the non-reference point cloud.

In one configuration, to exclude the at least one cloud point, the first network entity 602 may exclude the at least one cloud point based on a deviation of the at least one cloud point from a corresponding cloud point in the non-reference point cloud being greater than a threshold.

At 624, the first network entity 602 may transmit, for the second network entity 604, a second indication of the reference point cloud with the modified at least one cloud point or without the excluded at least one cloud point.

In some configurations, the first network entity 602 may be a UE or a TRP. At 626, the first network entity 602 may select a point cloud reporting mode for the first network entity 602 based on a power saving operation at the first network entity 602. The point cloud reporting mode may correspond to one of a full point cloud reporting mode, a single type point cloud reporting mode, or a point cloud reporting disabled mode.

In one configuration, the first network entity 602 may be TRP. The power saving operation at the first network entity 602 may correspond to a network energy state.

At 628, the first network entity 602 may transmit, for the second network entity 604, an indication of the selected point cloud reporting mode.

Block 630 may include 630a or 630b. At 630a, the first network entity 602 may refrain from generating or reporting one or more point clouds based on cellular sensing or non-cellular sensing if the selected point cloud reporting mode corresponds to the single type point cloud reporting mode. In some other configurations, at 630b, the first network entity 602 may refrain from generating or reporting any point clouds if the selected point cloud reporting mode corresponds to the point cloud reporting disabled mode.

In some configurations, the first network entity 602 may be a TRP. At 632, the first network entity 602 (e.g., a TRP) may adjust an antenna configuration at the first network entity 602 based on a power saving operation at the first network entity 602. The antenna configuration may correspond to an enablement or a disablement of one or more antennas or antenna panels.

FIG. 7 is a flowchart 700 of a method of wireless communication. The method may be performed by a first network entity (e.g., the first network entity 602; the UE 104/350; the apparatus 1104; the base station 102/310; the network entity 1102). At 702, the first network entity may transmit, for a second network entity, an indication of point cloud reporting capabilities of the first network entity. The point cloud reporting capabilities of the first network entity may include a capability associated with heterogeneous point cloud reporting. For example, 702 may be performed by the component 198 in FIG. 11 or the component 199 in the FIG. 12. Referring to FIG. 6, at 606, the first network entity 602 may transmit, for a second network entity 604, an indication of point cloud reporting capabilities of the first network entity 602.

At 704, the first network entity may identify a first point cloud based on non-cellular sensing. For example, 704 may be performed by the component 198 in FIG. 11 or the component 199 in the FIG. 12. Referring to FIG. 6, at 610, the first network entity 602 may identify a first point cloud based on non-cellular sensing.

At 706, the first network entity may transmit, for the second network entity, a first indication of the first point cloud based on the point cloud reporting capabilities of the first network entity. For example, 706 may be performed by the component 198 in FIG. 11 or the component 199 in the FIG. 12. Referring to FIG. 6, at 612, the first network entity 602 may transmit, for the second network entity 604, a first indication of the first point cloud based on the point cloud reporting capabilities of the first network entity 602.

Figure 8:
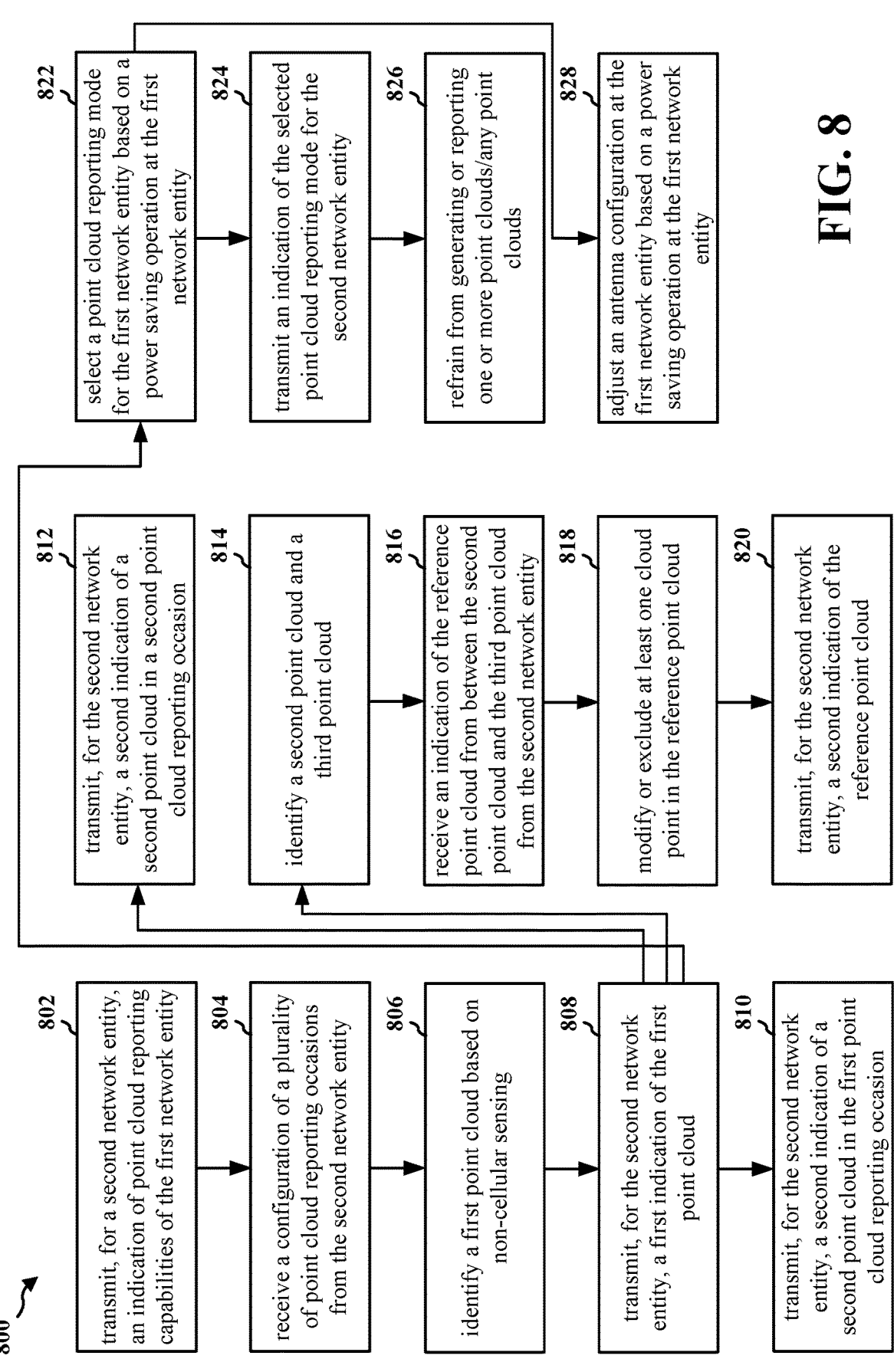
FIG. 8 is a flowchart of a method of wireless communication.

FIG. 8 is a flowchart 800 of a method of wireless communication. The method may be performed by a first network entity (e.g., the first network entity 602; the UE 104/350; the apparatus 1104; the base station 102/310; the network entity 1102). At 802, the first network entity may transmit, for a second network entity, an indication of point cloud reporting capabilities of the first network entity. The point cloud reporting capabilities of the first network entity may include a capability associated with heterogeneous point cloud reporting. For example, 802 may be performed by the component 198 in FIG. 11 or the component 199 in the FIG. 12. Referring to FIG. 6, at 606, the first network entity 602 may transmit, for a second network entity 604, an indication of point cloud reporting capabilities of the first network entity 602.

At 806, the first network entity may identify a first point cloud based on non-cellular sensing. For example, 806 may be performed by the component 198 in FIG. 11 or the component 199 in the FIG. 12. Referring to FIG. 6, at 610, the first network entity 602 may identify a first point cloud based on non-cellular sensing.

At 808, the first network entity may transmit, for the second network entity, a first indication of the first point cloud based on the point cloud reporting capabilities of the first network entity. For example, 808 may be performed by the component 198 in FIG. 11 or the component 199 in the FIG. 12. Referring to FIG. 6, at 612, the first network entity

602 may transmit, for the second network entity 604, a first indication of the first point cloud based on the point cloud reporting capabilities of the first network entity 602.

In one configuration, referring to FIG. 6, the point cloud reporting capabilities of the first network entity 602 may correspond to one or more of at least one reportable property, a point cloud source, or a frequency of point cloud generation.

In one configuration, the point cloud source may correspond to at least one of a cellular transceiver, an FMCW radar, a Wi-Fi transceiver, or a lidar device.

In one configuration, at 804, the first network entity may receive a configuration of a plurality of point cloud reporting occasions from the second network entity. For example, 804 may be performed by the component 198 in FIG. 11 or the component 199 in the FIG. 12. Referring to FIG. 6, at 608, the first network entity 602 may receive a configuration of a plurality of point cloud reporting occasions from the second network entity 604.

In one configuration, referring to FIG. 6, the first indication of the first point cloud may be transmitted by the first network entity 602, at 612, for the second network entity 604, in a first point cloud reporting occasion in the plurality of point cloud reporting occasions. At 810, the first network entity may transmit, for the second network entity, a second indication of a second point cloud in the first point cloud reporting occasion. The second point cloud may be based on cellular sensing. For example, 810 may be performed by the component 198 in FIG. 11 or the component 199 in the FIG. 12. Referring to FIG. 6, at 614, the first network entity 602 may transmit, for the second network entity 604, a second indication of a second point cloud in the first point cloud reporting occasion.

In one configuration, referring to FIG. 6, the first indication of the first point cloud may be transmitted by the first network entity 602, at 612, for the second network entity 604, in a first point cloud reporting occasion in the plurality of point cloud reporting occasions. The first point cloud reporting occasion may be associated with reporting of at least one non-cellular point cloud. At 812, the first network entity may transmit, for the second network entity, a second indication of a second point cloud in a second point cloud reporting occasion in the plurality of point cloud reporting occasions. The second point cloud may be based on cellular sensing. The second point cloud reporting occasion may be associated with reporting of at least one cellular point cloud. For example, 812 may be performed by the component 198 in FIG. 11 or the component 199 in the FIG. 12. Referring to FIG. 6, at 616, the first network entity 602 may transmit, for the second network entity 604, a second indication of a second point cloud in a second point cloud reporting occasion in the plurality of point cloud reporting occasions.

In one configuration, at 814, the first network entity may identify a second point cloud and a third point cloud. The second point cloud and the third point cloud may include a reference point cloud and a non-reference point cloud. For example, 814 may be performed by the component 198 in FIG. 11 or the component 199 in the FIG. 12. Referring to FIG. 6, at 618, the first network entity 602 may identify a second point cloud and a third point cloud.

At 818, the first network entity may modify or exclude at least one cloud point in the reference point cloud based on correlating the reference point cloud with the non-reference point cloud. For example, 818 may be performed by the component 198 in FIG. 11 or the component 199 in the FIG. 12. Referring to FIG. 6, at 622, the first network entity 602 may modify or exclude at least one cloud point in the reference point cloud based on correlating the reference point cloud with the non-reference point cloud.

At 820, the first network entity may transmit, for the second network entity, a second indication of the reference point cloud with the modified at least one cloud point or without the excluded at least one cloud point. For example, 820 may be performed by the component 198 in FIG. 11 or the component 199 in the FIG. 12. Referring to FIG. 6, at 624, the first network entity 602 may transmit, for the second network entity 604, a second indication of the reference point cloud with the modified at least one cloud point or without the excluded at least one cloud point.

In one configuration, the second point cloud and the third point cloud may include a cellular point cloud and a non-cellular point cloud. At 816, the first network entity may receive an indication of the reference point cloud from between the second point cloud and the third point cloud from the second network entity. For example, 816 may be performed by the component 198 in FIG. 11 or the component 199 in the FIG. 12. Referring to FIG. 6, at 620, the first network entity 602 may receive an indication of the reference point cloud from between the second point cloud and the third point cloud from the second network entity 604.

In one configuration, referring to FIG. 6, to exclude, at 622, the at least one cloud point, the first network entity 602 may exclude the at least one cloud point in response to a deviation of the at least one cloud point from a corresponding cloud point in the non-reference point cloud being greater than a threshold.

In one configuration, referring to FIG. 6, the first network entity 602 may be a UE or a TRP. At 822, the first network entity may select a point cloud reporting mode for the first network entity based on a power saving operation at the first network entity. The point cloud reporting mode may correspond to a full point cloud reporting mode, a single type point cloud reporting mode, or a point cloud reporting disabled mode. For example, 822 may be performed by the component 198 in FIG. 11 or the component 199 in the FIG. 12. Referring to FIG. 6, at 626, the first network entity 602 may select a point cloud reporting mode for the first network entity 602 based on a power saving operation at the first network entity 602.

At 824, the first network entity may transmit an indication of the selected point cloud reporting mode for the second network entity. For example, 824 may be performed by the component 198 in FIG. 11 or the component 199 in the FIG. 12. Referring to FIG. 6, at 628, the first network entity 602 may transmit an indication of the selected point cloud reporting mode for the second network entity 604.

At 826, the first network entity may refrain from generating or reporting one or more point clouds based on cellular sensing or non-cellular sensing if the selected point cloud reporting mode corresponds to the single type point cloud reporting mode, or may refrain from generating or reporting any point clouds if the selected point cloud reporting mode corresponds to the point cloud reporting disabled mode. For example, 826 may be performed by the component 198 in FIG. 11 or the component 199 in the FIG. 12. Referring to FIG. 6, at 630, the first network entity 602 may, at 630*a*, refrain from generating or reporting one or more point clouds based on cellular sensing or non-cellular sensing if the selected point cloud reporting mode corresponds to the single type point cloud reporting mode, or may, at 630*b*, refrain from generating or reporting any point clouds if the selected point cloud reporting mode corresponds to the point cloud reporting disabled mode.

In one configuration, referring to FIG. 6, the first network entity 602 may be the TRP. The power saving operation at the first network entity 602 may correspond to a network energy state.

In one configuration, referring to FIG. 6, the first network entity 602 may be a TRP. At 828, the first network entity may adjust an antenna configuration at the first network entity based on a power saving operation at the first network entity. The antenna configuration may correspond to an enablement or a disablement of one or more antennas or antenna panels. For example, 828 may be performed by the component 198 in FIG. 11 or the component 199 in the FIG. 12. Referring to FIG. 6, at 632, the first network entity 602 may adjust an antenna configuration at the first network entity 602 based on a power saving operation at the first network entity 602.

In one configuration, referring to FIG. 6, the first network entity 602 may include one of a UE, a TRP, or a base station. The second network entity 604 may include a sensing entity.

FIG. 9 is a flowchart 900 of a method of wireless communication. The method may be performed by a second network entity (e.g., the second network entity 604; the network entity 1360). At 902, the second network entity may receive an indication of point cloud reporting capabilities of a first network entity from the first network entity. The point cloud reporting capabilities of the first network entity may include a capability associated with heterogeneous point cloud reporting. For example, 902 may be performed by the component 1399 in FIG. 13. Referring to FIG. 6, at 606, the second network entity 604 may receive an indication of point cloud reporting capabilities of a first network entity 602 from the first network entity 602.

At 904, the second network entity may receive a first indication of a first point cloud from the first network entity based on the point cloud reporting capabilities of the first network entity. The first point cloud may be based on non-cellular sensing. For example, 904 may be performed by the component 1399 in FIG. 13. Referring to FIG. 6, at 612, the second network entity 604 may receive a first indication of a first point cloud from the first network entity 602 based on the point cloud reporting capabilities of the first network entity 602.

Figure 10:
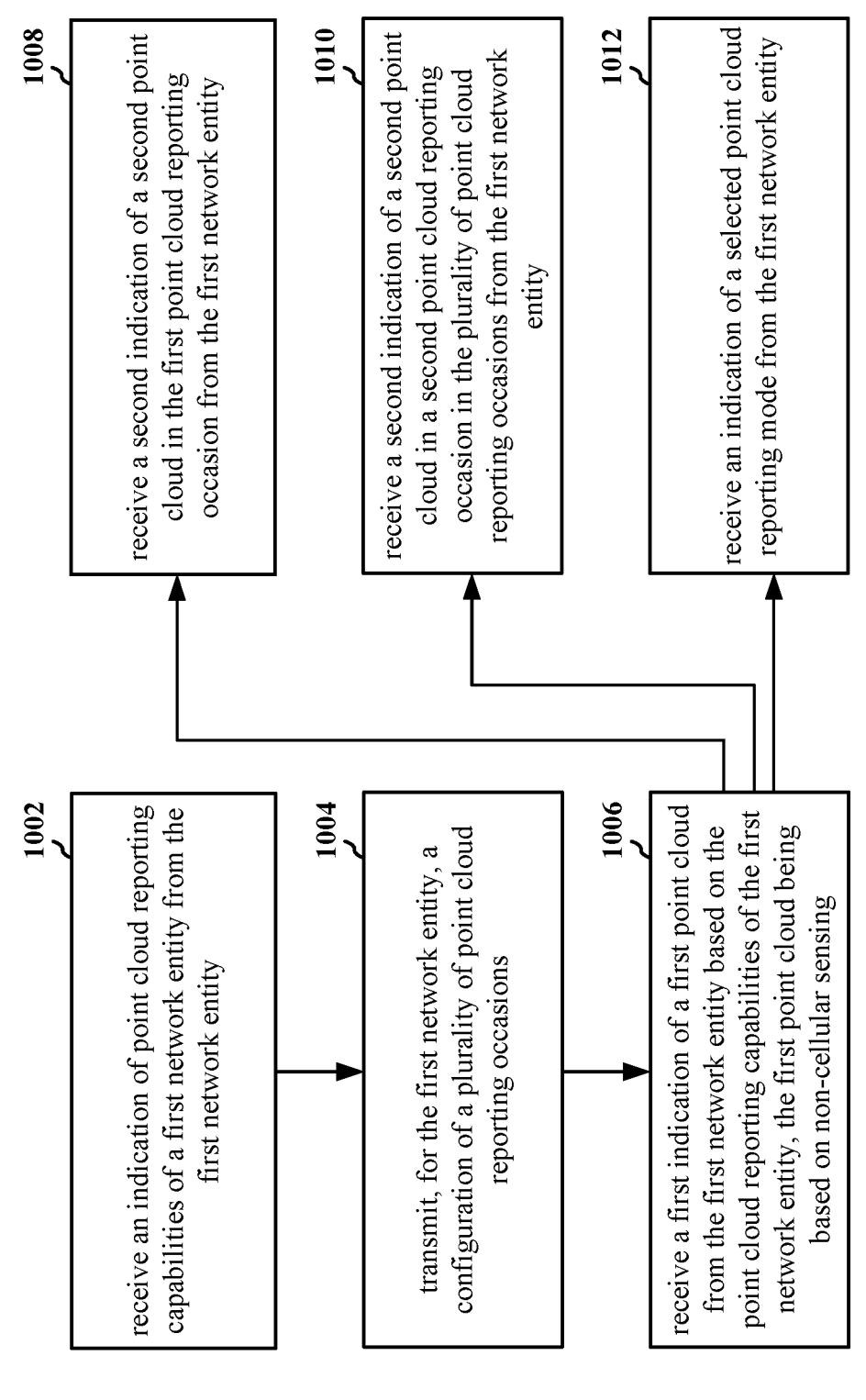
FIG. 10 is a flowchart of a method of wireless communication.

FIG. 10 is a flowchart 1000 of a method of wireless communication. The method may be performed by a second network entity (e.g., the second network entity 604; the network entity 1360). At 1002, the second network entity may receive an indication of point cloud reporting capabilities of a first network entity from the first network entity. The point cloud reporting capabilities of the first network entity may include a capability associated with heterogeneous point cloud reporting. For example, 1002 may be performed by the component 1399 in FIG. 13. Referring to FIG. 6, at 606, the second network entity 604 may receive an indication of point cloud reporting capabilities of a first network entity 602 from the first network entity 602.

At 1006, the second network entity may receive a first indication of a first point cloud from the first network entity based on the point cloud reporting capabilities of the first network entity. The first point cloud may be based on non-cellular sensing. For example, 1006 may be performed by the component 1399 in FIG. 13. Referring to FIG. 6, at 612, the second network entity 604 may receive a first indication of a first point cloud from the first network entity 602 based on the point cloud reporting capabilities of the first network entity 602.

In one configuration, referring to FIG. 6, the point cloud reporting capabilities of the first network entity 602 may correspond to one or more of at least one reportable property, a point cloud source, or a frequency of point cloud generation.

In one configuration, the point cloud source may correspond to at least one of a cellular transceiver, an FMCW radar, a Wi-Fi transceiver, or a lidar device.

In one configuration, at 1004, the second network entity may transmit, for the first network entity, a configuration of a plurality of point cloud reporting occasions. For example, 1004 may be performed by the component 1399 in FIG. 13. Referring to FIG. 6, at 608, the second network entity 604 may transmit, for the first network entity 602, a configuration of a plurality of point cloud reporting occasions.

In one configuration, referring to FIG. 6, the first indication of the first point cloud may be received by the second network entity 604, at 612, in a first point cloud reporting occasion in the plurality of point cloud reporting occasions from the first network entity 602. At 1008, the second network entity may receive a second indication of a second point cloud in the first point cloud reporting occasion from the first network entity. The second point cloud may be based on cellular sensing. For example, 1008 may be performed by the component 1399 in FIG. 13. Referring to FIG. 6, at 614, the second network entity 604 may receive a second indication of a second point cloud in the first point cloud reporting occasion from the first network entity 602.

In one configuration, referring to FIG. 6, the first indication of the first point cloud may be received by the second network entity 604, at 612, in a first point cloud reporting occasion in the plurality of point cloud reporting occasions from the first network entity 602. The first point cloud reporting occasion may be associated with reporting of at least one non-cellular point cloud. At 1010, the second network entity may receive a second indication of a second point cloud in a second point cloud reporting occasion in the plurality of point cloud reporting occasions from the first network entity. The second point cloud may be based on cellular sensing. The second point cloud reporting occasion may be associated with reporting of at least one cellular point cloud. For example, 1010 may be performed by the component 1399 in FIG. 13. Referring to FIG. 6, at 616, the second network entity 604 may receive a second indication of a second point cloud in a second point cloud reporting occasion in the plurality of point cloud reporting occasions from the first network entity 602.

In one configuration, referring to FIG. 6, the first network entity 602 may be a UE or a TRP. At 1012, the second network entity may receive an indication of a selected point cloud reporting mode from the first network entity. The selected point cloud reporting mode may be based on a power saving operation at the first network entity. The selected point cloud reporting mode may correspond to a full point cloud reporting mode, a single type point cloud reporting mode, or a point cloud reporting disabled mode. For example, 1012 may be performed by the component 1399 in FIG. 13. Referring to FIG. 6, at 628, the second network entity 604 may receive an indication of a selected point cloud reporting mode from the first network entity 602.

In one configuration, referring to FIG. 6, the first network entity 602 may be the TRP. The power saving operation at the first network entity 602 may correspond to a network energy state.

In one configuration, referring to FIG. 6, the first network entity 602 may include one of a UE, a TRP, or a base station. The second network entity may include a sensing entity.

Figure 11:
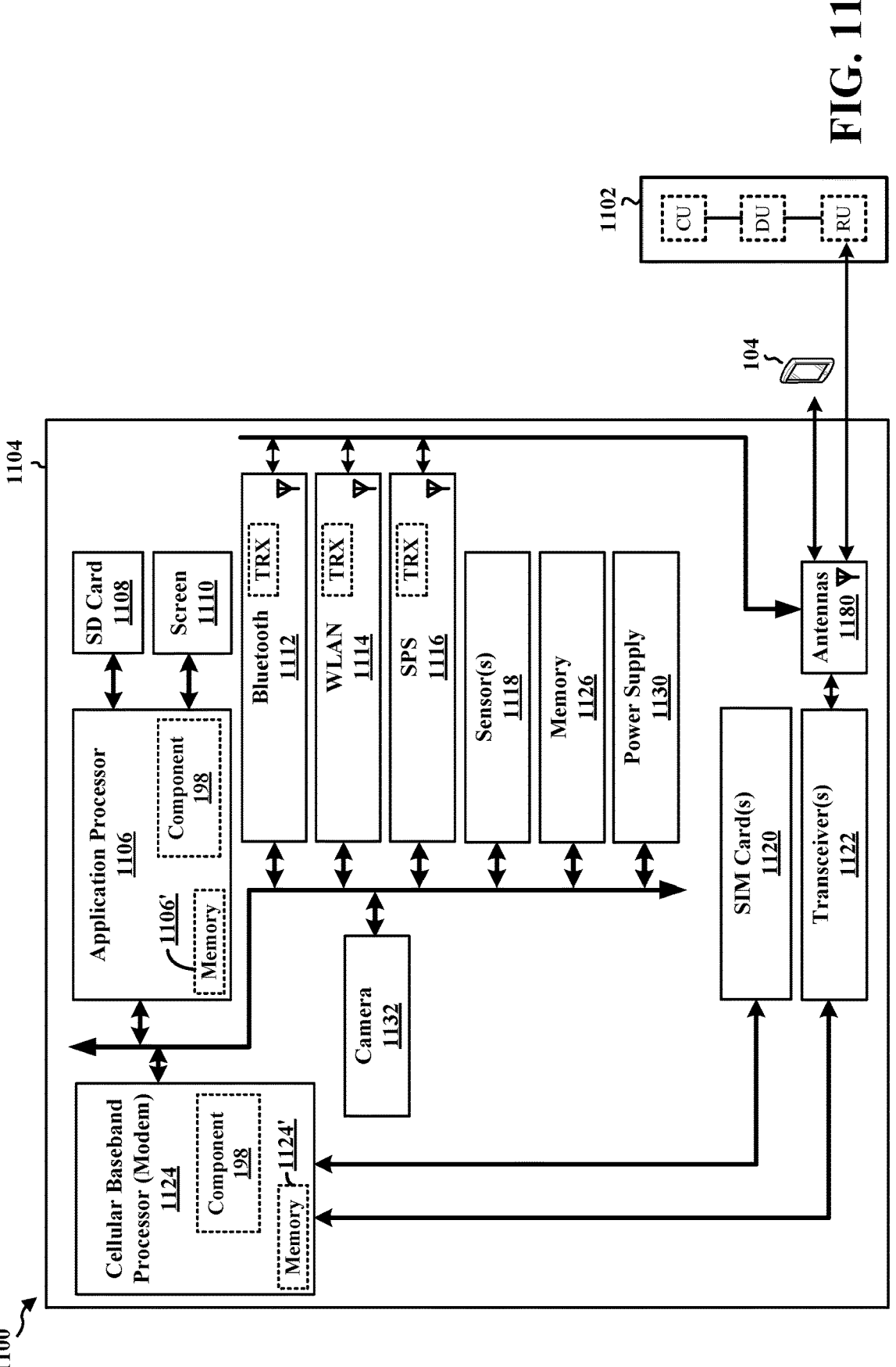
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (lidar), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to transmit, for a second network entity, an indication of point cloud reporting capabilities of the first network entity. The point cloud reporting capabilities of the first network entity may include a capability associated with heterogeneous point cloud reporting. The component 198 is configured to identify a first point cloud based on non-cellular sensing. The component 198 is configured to transmit, for the second network entity, a first indication of the first point cloud based on the point cloud reporting capabilities of the first network entity. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for transmitting, for a second network entity, an indication of point cloud reporting capabilities of the first network entity. The point cloud reporting capabilities of the first network entity may include a capability associated with heterogeneous point cloud reporting. The apparatus 1104, and in particular the cellular baseband processor 1124 and/or the application processor 1106, includes means for identifying a first point cloud based on non-cellular sensing. The apparatus 1104, and in particular the cellular baseband processor 1124 and/or the application processor 1106, includes means for transmitting, for the second network entity, a first indication of the first point cloud based on the point cloud reporting capabilities of the first network entity.

In one configuration, the point cloud reporting capabilities of the first network entity may correspond to one or more of at least one reportable property, a point cloud source, or a frequency of point cloud generation. In one configuration, the point cloud source may correspond to at least one of a cellular transceiver, an FMCW radar, a Wi-Fi transceiver, or a lidar device. In one configuration, the apparatus 1104, and in particular the cellular baseband processor 1124 and/or the application processor 1106, includes means for receiving a configuration of a plurality of point cloud reporting occasions from the second network entity. In one configuration, the means for transmitting the first indication of the first point cloud may be further configured to: transmit, for the second network entity, the first indication of the first point cloud in a first point cloud reporting occasion in the plurality of point cloud reporting occasions. The apparatus 1104, and in particular the cellular baseband processor 1124 and/or the application processor 1106, includes means for transmitting, for the second network entity, a second indication of a second point cloud in the first point cloud reporting occasion. The second point cloud may be based on cellular sensing. In one configuration, the means for transmitting the first indication of the first point cloud may be further configured to: transmit, for the second network entity, the first indication of the first point cloud in a first point cloud reporting occasion in the plurality of point cloud reporting occasions. The first point cloud reporting occasion may be associated with reporting of at least one non-cellular point cloud. The apparatus 1104, and in particular the cellular baseband processor 1124 and/or the application processor 1106, includes means for transmitting, for the second network entity, a second indication of a second point cloud in a second point cloud reporting occasion in the plurality of point cloud reporting occasions. The second point cloud may be based on cellular sensing. The second point cloud reporting occasion may be associated with reporting of at least one cellular point cloud. In one configuration, the apparatus 1104, and in particular the cellular baseband processor 1124 and/or the application processor 1106, includes means for identifying a second point cloud and a third point cloud. The second point cloud and the third point cloud may include a reference point cloud and a non-reference point cloud. The apparatus 1104, and in particular the cellular baseband processor 1124 and/or the application processor 1106, includes means for modifying or excluding at least one cloud point in the reference point cloud based on correlating the reference point cloud with the non-reference point cloud. The apparatus 1104, and in particular the cellular baseband processor 1124 and/or the application processor 1106, includes means for transmitting, for the second network entity, a second indication of the reference point cloud with the modified at least one cloud point or without the excluded at least one cloud point. In one configuration, the second point cloud and the third point cloud may include a cellular point cloud and a non-cellular point cloud. The apparatus 1104, and in particular the cellular baseband processor 1124 and/or the application processor 1106, includes means for receiving an indication of the reference point cloud from between the second point cloud and the third point cloud from the second network entity. In one configuration, the means for excluding the at least one cloud point may be further configured to exclude the at least one cloud point in response to a deviation of the at least one cloud point from a corresponding cloud point in the non-reference point cloud being greater than a threshold. In one configuration, the first network entity may be a UE or a TRP. The apparatus 1104, and in particular the cellular baseband processor 1124 and/or the application processor 1106, includes means for selecting a point cloud reporting mode for the first network entity based on a power saving operation at the first network entity. The point cloud reporting mode may correspond to a full point cloud reporting mode, a single type point cloud reporting mode, or a point cloud reporting disabled mode. The apparatus 1104, and in particular the cellular baseband processor 1124 and/or the application processor 1106, includes means for transmitting an indication of the selected point cloud reporting mode for the second network entity. The apparatus 1104, and in particular the cellular baseband processor 1124 and/or the application processor 1106, includes means for refraining from generating or reporting one or more point clouds based on cellular sensing or non-cellular sensing if the selected point cloud reporting mode corresponds to the single type point cloud reporting mode, or means for refraining from generating or reporting any point clouds if the selected point cloud reporting mode corresponds to the point cloud reporting disabled mode. In one configuration, the first network entity may be the TRP. The power saving operation at the first network entity may correspond to a network energy state. In one configuration, the first network entity may be a TRP. The apparatus 1104, and in particular the cellular baseband processor 1124 and/or the application processor 1106, includes means for adjusting an antenna configuration at the first network entity based on a power saving operation at the first network entity. The antenna configuration may correspond to an enablement or a disablement of one or more antennas or antenna panels. In one configuration, the first network entity may include one of a UE, a TRP, or a base station. The second network entity may include a sensing entity.

The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
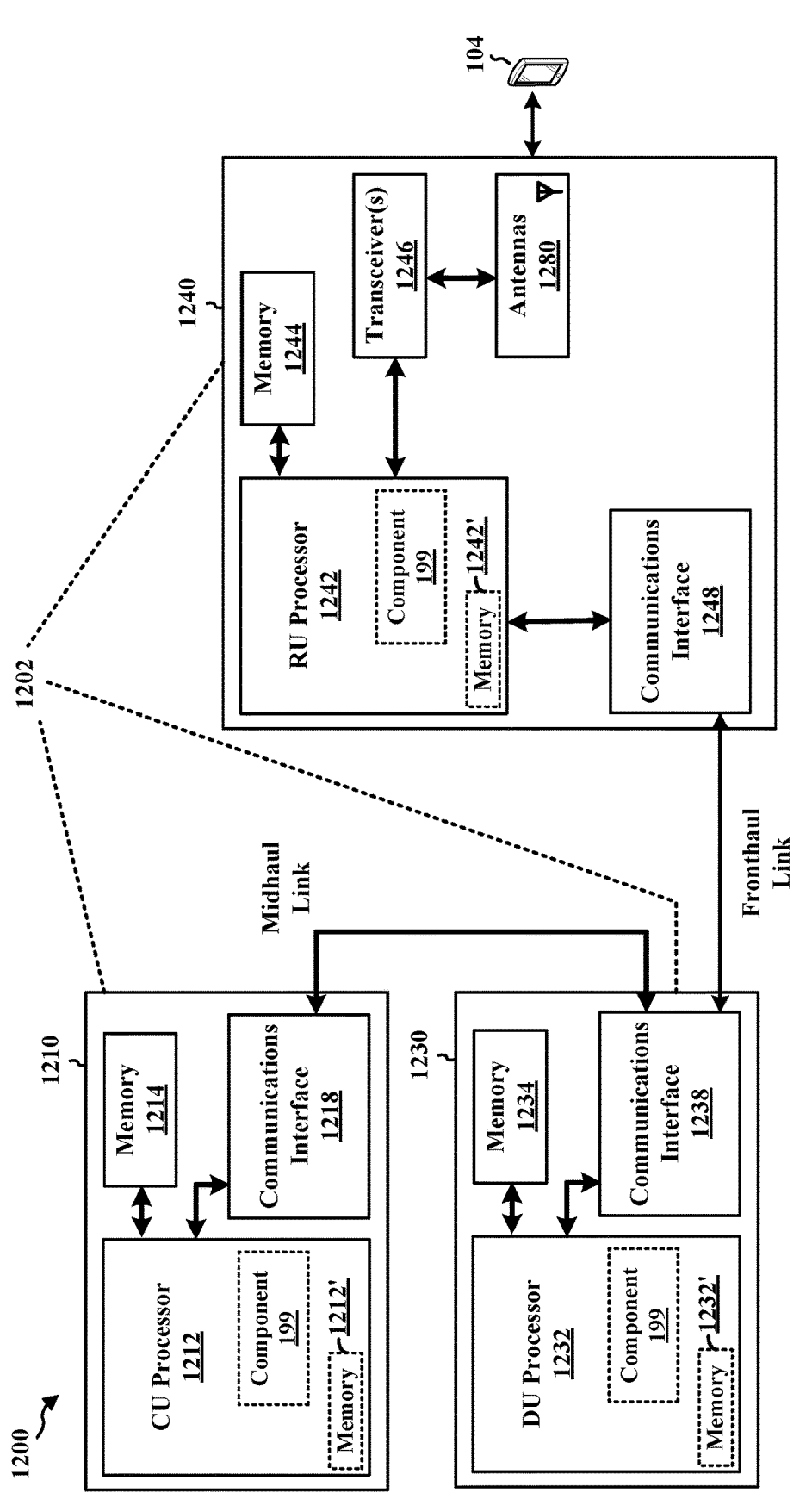
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit, for a second network entity, an indication of point cloud reporting capabilities of the first network entity. The point cloud reporting capabilities of the first network entity may include a capability associated with heterogeneous point cloud reporting. The component 199 is configured to identify a first point cloud based on non-cellular sensing. The component 199 is configured to transmit, for the second network entity, a first indication of the first point cloud based on the point cloud reporting capabilities of the first network entity. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for transmitting, for a second network entity, an indication of point cloud reporting capabilities of the first network entity. The point cloud reporting capabilities of the first network entity may include a capability associated with heterogeneous point cloud reporting. The network entity 1202 includes means for identifying a first point cloud based on non-cellular sensing. The network entity 1202 includes means for transmitting, for the second network entity, a first indication of the first point cloud based on the point cloud reporting capabilities of the first network entity.

In one configuration, the point cloud reporting capabilities of the first network entity may correspond to one or more of at least one reportable property, a point cloud source, or a frequency of point cloud generation. In one configuration, the point cloud source may correspond to at least one of a cellular transceiver, an FMCW radar, a Wi-Fi transceiver, or a lidar device. In one configuration, the network entity 1202 includes means for receiving a configuration of a plurality of point cloud reporting occasions from the second network entity. In one configuration, the means for transmitting the first indication of the first point cloud may be further configured to: transmit, for the second network entity, the first indication of the first point cloud in a first point cloud reporting occasion in the plurality of point cloud reporting occasions. The network entity 1202 includes means for transmitting, for the second network entity, a second indication of a second point cloud in the first point cloud reporting occasion. The second point cloud may be based on cellular sensing. In one configuration, the means for transmitting the first indication of the first point cloud may be further configured to: transmit, for the second network entity, the first indication of the first point cloud in a first point cloud reporting occasion in the plurality of point cloud reporting occasions. The first point cloud reporting occasion may be associated with reporting of at least one non-cellular point cloud. The network entity 1202 includes means for transmitting, for the second network entity, a second indication of a second point cloud in a second point cloud reporting occasion in the plurality of point cloud reporting occasions. The second point cloud may be based on cellular sensing. The second point cloud reporting occasion may be associated with reporting of at least one cellular point cloud. In one configuration, the network entity 1202 includes means for identifying a second point cloud and a third point cloud. The second point cloud and the third point cloud may include a reference point cloud and a non-reference point cloud. The network entity 1202 includes means for modifying or excluding at least one cloud point in the reference point cloud based on correlating the reference point cloud with the non-reference point cloud. The network entity 1202 includes means for transmitting, for the second network entity, a second indication of the reference point cloud with the modified at least one cloud point or without the excluded at least one cloud point. In one configuration, the second point cloud and the third point cloud may include a cellular point cloud and a non-cellular point cloud. The network entity 1202 includes means for receiving an indication of the reference point cloud from between the second point cloud and the third point cloud from the second network entity. In one configuration, the means for excluding the at least one cloud point may be further configured to exclude the at least one cloud point in response to a deviation of the at least one cloud point from a corresponding cloud point in the non-reference point cloud being greater than a threshold. In one configuration, the first network entity may be a UE or a TRP. The network entity 1202 includes means for selecting a point cloud reporting mode for the first network entity based on a power saving operation at the first network entity. The point cloud reporting mode may correspond to a full point cloud reporting mode, a single type point cloud reporting mode, or a point cloud reporting disabled mode. The network entity 1202 includes means for transmitting an indication of the selected point cloud reporting mode for the second network entity. The network entity 1202 includes means for refraining from generating or reporting one or more point clouds based on cellular sensing or non-cellular sensing if the selected point cloud reporting mode corresponds to the single type point cloud reporting mode, or means for refraining from generating or reporting any point clouds if the selected point cloud reporting mode corresponds to the point cloud reporting disabled mode. In one configuration, the first network entity may be the TRP. The power saving operation at the first network entity may correspond to a network energy state. In one configuration, the first network entity may be a TRP. The network entity 1202 includes means for adjusting an antenna configuration at the first network entity based on a power saving operation at the first network entity. The antenna configuration may correspond to an enablement or a disablement of one or more antennas or antenna panels. In one configuration, the first network entity may include one of a UE, a TRP, or a base station. The second network entity may include a sensing entity.

The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
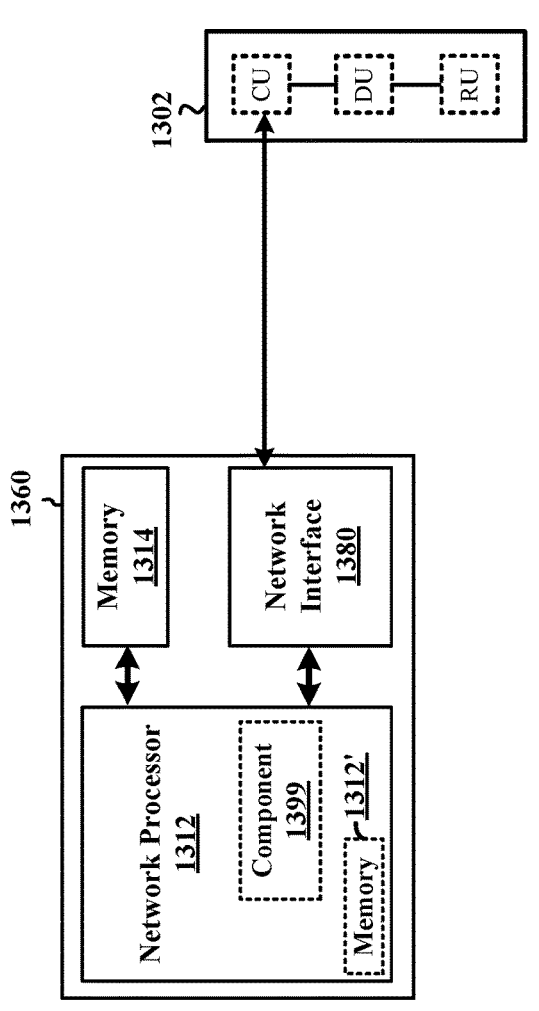
FIG. 13 is a diagram illustrating an example of a hardware implementation for an example network entity.

FIG. 13 is a diagram 1300 illustrating an example of a hardware implementation for a network entity 1360 (e.g., a sensing entity). In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 1399 is configured to receive an indication of point cloud reporting capabilities of a first network entity from the first network entity. The point cloud reporting capabilities of the first network entity may include a capability associated with heterogeneous point cloud reporting. The component 1399 is configured to receive a first indication of a first point cloud from the first network entity based on the point cloud reporting capabilities of the first network entity. The first point cloud may be based on non-cellular sensing. The component 1399 may be within the processor 1312. The component 1399 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 includes means for receiving an indication of point cloud reporting capabilities of a first network entity from the first network entity. The point cloud reporting capabilities of the first network entity may include a capability associated with heterogeneous point cloud reporting. The network entity 1360 includes means for receiving a first indication of a first point cloud from the first network entity based on the point cloud reporting capabilities of the first network entity. The first point cloud may be based on non-cellular sensing.

In one configuration, the point cloud reporting capabilities of the first network entity may correspond to one or more of at least one reportable property, a point cloud source, or a frequency of point cloud generation. In one configuration, the point cloud source may correspond to at least one of a cellular transceiver, an FMCW radar, a Wi-Fi transceiver, or a lidar device. In one configuration, the network entity 1360 includes means for transmitting, for the first network entity, a configuration of a plurality of point cloud reporting occasions. In one configuration, the means for receiving the first indication of the first point cloud may be further configured to: receive the first indication of the first point cloud in a first point cloud reporting occasion in the plurality of point cloud reporting occasions from the first network entity. The network entity 1360 includes means for receiving a second indication of a second point cloud in the first point cloud reporting occasion from the first network entity. The second point cloud may be based on cellular sensing. In one configuration, the means for receiving the first indication of the first point cloud may be further configured to: receive the first indication of the first point cloud in a first point cloud reporting occasion in the plurality of point cloud reporting occasions from the first network entity. The first point cloud reporting occasion may be associated with reporting of at least one non-cellular point cloud. The network entity 1360 includes means for receiving a second indication of a second point cloud in a second point cloud reporting occasion in the plurality of point cloud reporting occasions from the first network entity. The second point cloud may be based on cellular sensing. The second point cloud reporting occasion may be associated with reporting of at least one cellular point cloud. In one configuration, the first network entity may be a UE or a TRP. The network entity 1360 includes means for receiving an indication of a selected point cloud reporting mode from the first network entity. The selected point cloud reporting mode may be based on a power saving operation at the first network entity. The selected point cloud reporting mode may correspond to a full point cloud reporting mode, a single type point cloud reporting mode, or a point cloud reporting disabled mode. In one configuration, the first network entity may be the TRP. The power saving operation at the first network entity may correspond to a network energy state. In one configuration, the first network entity may include one of a UE, a TRP, or a base station. The second network entity may include a sensing entity.

The means may be the component 1399 of the network entity 1360 configured to perform the functions recited by the means.

Referring back to FIGS. 5-13, a first network entity may transmit, for a second network entity, an indication of point cloud reporting capabilities of the first network entity. The point cloud reporting capabilities of the first network entity may include a capability associated with heterogeneous point cloud reporting. The first network entity may identify a first point cloud based on non-cellular sensing. The first network entity may transmit, for the second network entity, a first indication of the first point cloud based on the point cloud reporting capabilities of the first network entity.

Accordingly, non-cellular point clouds may be reported by the entity that performs sensing/reporting to the sensing entity, alone or together with cellular point clouds.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be infor-mation, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network entity, including transmitting, for a second network entity, an indication of point cloud reporting capabilities of the first network entity, the point cloud reporting capabilities of the first network entity including a capability associated with heterogeneous point cloud reporting; identify a first point cloud based on non-cellular sensing; and transmitting, for the second network entity, a first indication of the first point cloud based on the point cloud reporting capabilities of the first network entity.

Aspect 2 is the method of aspect 1, where the point cloud reporting capabilities of the first network entity correspond to one or more of at least one reportable property, a point cloud source, or a frequency of point cloud generation.

Aspect 3 is the method of aspect 2, where the point cloud source corresponds to at least one of a cellular transceiver, an FMCW radar, a Wi-Fi transceiver, or a lidar device.

Aspect 4 is the method of any of aspects 1 to 3, further including: receiving a configuration of a plurality of point cloud reporting occasions from the second network entity.

Aspect 5 is the method of aspect 4, where transmitting the first indication of the first point cloud further includes transmitting, for the second network entity, the first indication of the first point cloud in a first point cloud reporting occasion in the plurality of point cloud reporting occasions, and the method further includes: transmitting, for the second network entity, a second indication of a second point cloud in the first point cloud reporting occasion, the second point cloud being based on cellular sensing.

Aspect 6 is the method of aspect 4, where transmitting the first indication of the first point cloud further includes transmitting, for the second network entity, the first indication of the first point cloud in a first point cloud reporting occasion in the plurality of point cloud reporting occasions, the first point cloud reporting occasion being associated with reporting of at least one non-cellular point cloud, and the method further includes: transmitting, for the second network entity, a second indication of a second point cloud in a second point cloud reporting occasion in the plurality of point cloud reporting occasions, the second point cloud being based on cellular sensing, the second point cloud reporting occasion being associated with reporting of at least one cellular point cloud.

Aspect 7 is the method of any of aspects 1 to 6, further including: identifying a second point cloud and a third point cloud, the second point cloud and the third point cloud including a reference point cloud and a non-reference point cloud; modifying or excluding at least one cloud point in the reference point cloud based on correlating the reference point cloud with the non-reference point cloud; and transmitting, for the second network entity, a second indication of the reference point cloud with the modified at least one cloud point or without the excluded at least one cloud point.

Aspect 8 is the method of aspect 7, where the second point cloud and the third point cloud include a cellular point cloud and a non-cellular point cloud, and the method further includes: receiving an indication of the reference point cloud from between the second point cloud and the third point cloud from the second network entity.

Aspect 9 is the method of any of aspects 7 and 8, where excluding the at least one cloud point further includes excluding the at least one cloud point in response to a deviation of the at least one cloud point from a corresponding cloud point in the non-reference point cloud being greater than a threshold.

Aspect 10 is the method of any of aspects 1 to 9, where the first network entity is a UE or a TRP, and the method further includes: selecting a point cloud reporting mode for the first network entity based on a power saving operation at the first network entity, the point cloud reporting mode corresponding to a full point cloud reporting mode, a single type point cloud reporting mode, or a point cloud reporting disabled mode; transmitting an indication of the selected point cloud reporting mode for the second network entity; and refraining from generating or reporting one or more point clouds based on cellular sensing or non-cellular sensing if the selected point cloud reporting mode corresponds to the single type point cloud reporting mode, or refraining from generating or reporting any point clouds if the selected point cloud reporting mode corresponds to the point cloud reporting disabled mode.

Aspect 11 is the method of aspect 10, where the first network entity is the TRP, and the power saving operation at the first network entity corresponds to a network energy state.

Aspect 12 is the method of any of aspects 1 to 11, where the first network entity is a TRP, and the method further includes: adjusting an antenna configuration at the first network entity based on a power saving operation at the first network entity, the antenna configuration corresponding to an enablement or a disablement of one or more antennas or antenna panels.

Aspect 13 is the method of any of aspects 1 to 12, where the first network entity includes one of a UE, a TRP, or a base station, and the second network entity includes a sensing entity.

Aspect 14 is a method of wireless communication at a second network entity, including receiving an indication of point cloud reporting capabilities of a first network entity from the first network entity, the point cloud reporting capabilities of the first network entity including a capability associated with heterogeneous point cloud reporting; and receiving a first indication of a first point cloud from the first network entity based on the point cloud reporting capabilities of the first network entity, the first point cloud being based on non-cellular sensing.

Aspect 15 is the method of aspect 14, where the point cloud reporting capabilities of the first network entity correspond to one or more of at least one reportable property, a point cloud source, or a frequency of point cloud generation.

Aspect 16 is the method of aspect 15, where the point cloud source corresponds to at least one of a cellular transceiver, an FMCW radar, a Wi-Fi transceiver, or a lidar device.

Aspect 17 is the method of any of aspects 14 to 16, further including: transmitting, for the first network entity, a configuration of a plurality of point cloud reporting occasions.

Aspect 18 is the method of aspect 17, where receiving the first indication of the first point cloud further includes: receiving the first indication of the first point cloud in a first point cloud reporting occasion in the plurality of point cloud reporting occasions from the first network entity, and the method further includes: receiving a second indication of a second point cloud in the first point cloud reporting occasion from the first network entity, the second point cloud being based on cellular sensing.

Aspect 19 is the method of aspect 17, where receiving the first indication of the first point cloud further includes: receiving the first indication of the first point cloud in a first point cloud reporting occasion in the plurality of point cloud reporting occasions from the first network entity, the first point cloud reporting occasion being associated with reporting of at least one non-cellular point cloud, and the method further includes: receiving a second indication of a second point cloud in a second point cloud reporting occasion in the plurality of point cloud reporting occasions from the first network entity, the second point cloud being based on cellular sensing, the second point cloud reporting occasion being associated with reporting of at least one cellular point cloud.

Aspect 20 is the method of any of aspects 14 to 19, where the first network entity is a UE or a TRP, and the method further includes: receiving an indication of a selected point cloud reporting mode from the first network entity, the selected point cloud reporting mode being based on a power saving operation at the first network entity, the selected point cloud reporting mode corresponding to a full point cloud reporting mode, a single type point cloud reporting mode, or a point cloud reporting disabled mode.

Aspect 21 is the method of aspect 20, where the first network entity is the TRP, and the power saving operation at the first network entity corresponds to a network energy state.

Aspect 22 is the method of any of aspects 14 to 21, where the first network entity includes one of a UE, a TRP, or a base station, and the second network entity includes a sensing entity.

Aspect 23 is an apparatus for wireless communication including at least one processor coupled to a memory and, based at least in part on information stored in the memory, the at least one processor is configured to implement a method as in any of aspects 1 to 22.

Aspect 24 may be combined with aspect 23 and further includes a transceiver coupled to the at least one processor.

Aspect 25 is an apparatus for wireless communication including means for implementing any of aspects 1 to 22.

Aspect 26 is a non-transitory computer-readable storage medium storing computer executable code, where the code when executed by a processor causes the processor to implement any of aspects 1 to 22.

Various aspects have been described herein. These and other aspects are within the scope of the following claims.

What is claimed is:

1. An apparatus for wireless communication at a first network entity, comprising:

at least one transceiver;

at least one memory; and at least one processor coupled to the at least one transceiver and the at least one memory and, based at least in part on information stored in the at least one memory, the at least one processor is configured to:

transmit, for a second network entity via the at least one transceiver, an indication of point cloud reporting capabilities of the first network entity, the point cloud reporting capabilities of the first network entity comprising a capability associated with heterogeneous point cloud reporting;

receive a configuration of a plurality of point cloud reporting occasions from the second network entity;

identify a first point cloud based on non-cellular sensing;

transmit, for the second network entity via the at least one transceiver and based on the point cloud reporting capabilities of the first network entity, a first indication of the first point cloud in a first point cloud reporting occasion of the plurality of point cloud reporting occasions, the first point cloud reporting occasion is associated with reporting of at least one non-cellular point cloud and at least one cellular point cloud; and transmit, for the second network entity, a second indication of a second point cloud in the first point cloud reporting occasion, the second point cloud being based on cellular sensing.

2. The apparatus of claim 1, wherein the point cloud reporting capabilities of the first network entity correspond to one or more of at least one reportable property, a point cloud source, or a frequency of point cloud generation.

3. The apparatus of claim 2, wherein the point cloud source corresponds to at least one of a cellular transceiver, a frequency-modulated continuous wave (FMCW) radar, a Wi-Fi transceiver, or a light detection and ranging (lidar) device.

4. The apparatus of claim 1, wherein the at least one processor being further configured to:

identify a third point cloud, the second point cloud and the third point cloud comprising a reference point cloud and a non-reference point cloud;

modify or exclude at least one cloud point in the reference point cloud based on correlating the reference point cloud with the non-reference point cloud; and transmit, for the second network entity, a third indication of the reference point cloud with the modified at least one cloud point or without the excluded at least one cloud point.

5. The apparatus of claim 4, wherein the first network entity is a transmit receive point (TRP), and the at least one processor is further configured to:

adjust an antenna configuration at the first network entity based on a power saving operation at the first network entity, the antenna configuration corresponding to an enablement or a disablement of one or more antennas or antenna panels.

6. An apparatus for wireless communication at a first network entity, comprising:

at least one transceiver;

at least one memory; and at least one processor coupled to the at least one transceiver and the at least one memory and, based at least in part on information stored in the at least one memory, the at least one processor is configured to:

transmit, for a second network entity via the at least one transceiver, an indication of point cloud reporting capabilities of the first network entity, the point cloud reporting capabilities of the first network entity comprising a capability associated with heterogeneous point cloud reporting;

receive a configuration of a plurality of point cloud reporting occasions from the second network entity;

identify a first point cloud based on non-cellular sensing;

transmit, for the second network entity via the at least one transceiver and based on the point cloud reporting capabilities of the first network entity, a first indication of the first point cloud in a first point cloud reporting occasion in the plurality of point cloud reporting occasions, the first point cloud reporting occasion being associated with reporting of at least one non-cellular point cloud; and transmit, for the second network entity, a second indication of a second point cloud in a second point cloud reporting occasion in the plurality of point cloud reporting occasions, the second point cloud being based on cellular sensing, the second point cloud reporting occasion being associated with reporting of at least one cellular point cloud.

7. An apparatus for wireless communication at a first network entity, comprising:

at least one transceiver;

at least one memory; and at least one processor coupled to the at least one transceiver and the at least one memory and, based at least in part on information stored in the at least one memory, the at least one processor if configured to:

transmit, for a second network entity via the at least one transceiver, an indication of point cloud reporting capabilities of the first network entity, the point cloud reporting capabilities of the first network entity comprising a capability associated with heterogeneous point cloud reporting;

identify a first point cloud based on non-cellular sensing;

transmit, for the second network entity via the at least one transceiver, a first indication of the first point cloud based on the point cloud reporting capabilities of the first network entity;

identify a second point cloud and a third point cloud, receive an indication of a reference point cloud between the second point cloud and the third point cloud from the second network entity, wherein the second point cloud and the third point cloud comprising the reference point cloud and a non-reference point cloud;

modify or exclude at least one cloud point in the reference point cloud based on correlating the reference point cloud with the non-reference point cloud; and transmit, for the second network entity, a second indication of the reference point cloud with the modified at least one cloud point or without the excluded at least one cloud point.

8. The apparatus of claim 7, wherein the point cloud reporting capabilities of the first network entity correspond to one or more of at least one reportable property, a point cloud source, or a frequency of point cloud generation.

9. The apparatus of claim 7, wherein to exclude the at least one cloud point, the at least one processor is configured to exclude the at least one cloud point in response to a deviation of the at least one cloud point from a corresponding cloud point in the non-reference point cloud being greater than a threshold.

10. An apparatus for wireless communication at a first network entity, comprising:

at least one transceiver;

at least one memory; and at least one processor coupled to the at least one transceiver and the at least one memory and, based at least in part on information stored in the at least one memory, the at least one processor if configured to:

transmit, for a second network entity via the at least one transceiver, an indication of point cloud reporting capabilities of the first network entity, the point cloud reporting capabilities of the first network entity comprising a capability associated with heterogeneous point cloud reporting, wherein the first network entity is a user equipment (UE) or a transmit receive point (TRP);

identify a first point cloud based on non-cellular sensing;

transmit, for the second network entity via the at least one transceiver, a first indication of the first point cloud based on the point cloud reporting capabilities of the first network entity;

select a point cloud reporting mode for the first network entity based on a power saving operation at the first network entity, the point cloud reporting mode corresponding to a full point cloud reporting mode, a single type point cloud reporting mode, or a point cloud reporting disabled mode;

transmit an indication of the selected point cloud reporting mode for the second network entity; and refrain from generating or reporting one or more point clouds based on cellular sensing or non-cellular sensing if the selected point cloud reporting mode corresponds to the single type point cloud reporting mode, or refrain from generating or reporting any point clouds if the selected point cloud reporting mode corresponds to the point cloud reporting disabled mode.

11. The apparatus of claim 10, wherein the first network entity is the TRP, and the power saving operation at the first network entity corresponds to a network energy state.

12. The apparatus of claim 1, wherein the first network entity is a transmit receive point (TRP), and the at least one processor is further configured to:

adjust an antenna configuration at the first network entity based on a power saving operation at the first network entity, the antenna configuration corresponding to an enablement or a disablement of one or more antennas or antenna panels.

13. The apparatus of claim 1, wherein the first network entity comprises one of a user equipment (UE), a transmit receive point (TRP), or a base station, and the second network entity comprises a sensing entity.

* * * * *